US012112095B2

(12) United States Patent
Lee et al.

(10) Patent No.: US 12,112,095 B2
(45) Date of Patent: Oct. 8, 2024

(54) METHOD FOR EXECUTING APPLICATION AND APPARATUS THEREFOR

(71) Applicant: SAMSUNG ELECTRONICS CO., LTD., Suwon-si (KR)

(72) Inventors: Dong-hyeon Lee, Suwon-si (KR); Se-chun Kang, Incheon (KR); Yu-bin Seo, Suwon-si (KR); He-jung Yang, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 871 days.

(21) Appl. No.: 16/956,833

(22) PCT Filed: Feb. 28, 2018

(86) PCT No.: PCT/KR2018/002467
§ 371 (c)(1),
(2) Date: Nov. 22, 2021

(87) PCT Pub. No.: WO2019/124631
PCT Pub. Date: Jun. 27, 2019

(65) Prior Publication Data
US 2022/0113934 A1 Apr. 14, 2022

(30) Foreign Application Priority Data
Dec. 22, 2017 (KR) .................... 10-2017-0178472

(51) Int. Cl.
*G06F 3/0482* (2013.01)
*G06F 3/0481* (2022.01)
(Continued)

(52) U.S. Cl.
CPC ............ *G06F 3/167* (2013.01); *G06F 3/0481* (2013.01); *G06F 3/0484* (2013.01); *G06F 3/14* (2013.01)

(58) Field of Classification Search
CPC .. G06F 3/0482; G06F 3/04842; G06F 40/174; G06F 40/186; G06F 3/167;
(Continued)

(56) References Cited

U.S. PATENT DOCUMENTS 7,050,976 B1 * 5/2006 Packingham ........... G10L 15/26
704/E15.045
8,311,836 B2 11/2012 Ativanichayaphong et al.
(Continued)

FOREIGN PATENT DOCUMENTS

CN 104904227 A 9/2015
CN 106796788 A 5/2017
(Continued)

OTHER PUBLICATIONS

Communication dated Nov. 30, 2020 issued by the European Intellectual Property Office in European Application No. 18890757.0.
(Continued)

*Primary Examiner* — Jakieda R Jackson
(74) *Attorney, Agent, or Firm* — Sughrue Mion, PLLC

(57) ABSTRACT

Provided is a device for executing an application including a graphics user interface (GUI) for receiving an input value of an input field, the device including an audio output unit, a user input unit receiving a user input to request execution of the application, and a control unit configured to output, through the audio output unit, an audio signal indicating an induced inquiry corresponding to the input field, based on whether the user input is a voice input, to receive a voice input indicating a response to the induced inquiry, and to execute the application by setting an input value for the input field based on the voice input indicating the response to the induced inquiry.

12 Claims, 21 Drawing Sheets

(51) Int. Cl.
*G06F 3/0484* (2022.01)
*G06F 3/14* (2006.01)
*G06F 3/16* (2006.01)

(58) Field of Classification Search
CPC ... G06F 3/04883; G06F 17/243; G10L 15/22; G10L 2015/223
See application file for complete search history.

(56) References Cited

U.S. PATENT DOCUMENTS

| | | | |
|---|---|---|---|
| 8,315,874 B2 | 11/2012 | Barton et al. | |
| 9,081,550 B2 | 7/2015 | Öz et al. | |
| 10,705,794 B2 | 7/2020 | Gruber et al. | |
| 2002/0138266 A1* | 9/2002 | Ross | G10L 15/1822 704/E15.044 |
| 2006/0271368 A1 | 11/2006 | Carmiel et al. | |
| 2010/0169098 A1* | 7/2010 | Patch | G10L 15/193 704/275 |
| 2011/0173537 A1* | 7/2011 | Hemphill | G06F 16/48 715/764 |
| 2011/0288859 A1* | 11/2011 | Taylor | G10L 15/005 704/E21.001 |
| 2011/0301943 A1* | 12/2011 | Patch | G06F 3/167 704/9 |
| 2011/0301955 A1 | 12/2011 | Byrne et al. | |
| 2012/0215543 A1* | 8/2012 | Oz | G06F 8/38 704/E15.001 |
| 2012/0323557 A1* | 12/2012 | Koll | G10L 15/183 704/8 |
| 2014/0012585 A1 | 1/2014 | Heo et al. | |
| 2014/0195230 A1 | 7/2014 | Han et al. | |
| 2014/0278427 A1 | 9/2014 | Riviere Escobedo et al. | |
| 2015/0033111 A1* | 1/2015 | Sevenster | G06F 40/106 715/230 |
| 2015/0039307 A1 | 2/2015 | Jeon et al. | |
| 2015/0039318 A1* | 2/2015 | Shin | G06F 3/04817 704/275 |
| 2015/0331665 A1 | 11/2015 | Ishii et al. | |
| 2016/0063998 A1 | 3/2016 | Krishnampprthy et al. | |
| 2016/0224217 A1 | 8/2016 | Kim et al. | |
| 2016/0260433 A1 | 9/2016 | Sumner et al. | |
| 2017/0004210 A1 | 1/2017 | Agarwal et al. | |
| 2017/0084274 A1 | 3/2017 | Kim et al. | |
| 2017/0102871 A1* | 4/2017 | Won | G06F 9/451 |
| 2018/0225038 A1* | 8/2018 | Kennedy | G06F 3/04842 |

FOREIGN PATENT DOCUMENTS

| | | |
|---|---|---|
| CN | 107093423 A | 8/2017 |
| CN | 107454243 A | 12/2017 |
| EP | 2 642 382 A1 | 9/2013 |
| JP | 2003-76538 A | 3/2003 |
| JP | 2007-033478 A | 2/2007 |
| JP | 2014-064278 A | 4/2014 |
| JP | 2016-72888 A | 5/2016 |
| JP | 2017-58673 A | 3/2017 |
| KR | 10-2007-0093326 A | 9/2007 |
| KR | 10-2008-0013921 A | 2/2008 |
| KR | 10-2009-0115599 A | 11/2009 |
| KR | 10-2013-0035983 A | 4/2013 |
| KR | 10-2014-0112364 A | 9/2014 |
| KR | 10-1447879 B1 | 10/2014 |
| KR | 10-1508444 B1 | 4/2015 |
| KR | 10-2016-0010523 A | 1/2016 |
| KR | 10-2016-0093471 A | 8/2016 |
| WO | 2016/160852 A1 | 10/2016 |

OTHER PUBLICATIONS

Communication dated Oct. 28, 2022, issued by the Korean Intellectual Property Office in Korean Patent Application No. 10-2017-0178472.
Communication dated May 24, 2022 issued by the European Patent Office in European Application No. 18890757.0.
Communication dated Apr. 5, 2022 issued by the Korean Intellectual Property Office in Korean Application No. 10-2017-0178472.
Written Opinion (PCT/ISA/237) issued Sep. 12, 2018 by the International Searching Authority in International Application No. PCT/KR2018/002467.
International Search Report (PCT/ISA/210), issued Sep. 12, 2018 by International Searching Authority in International Application No. PCT/KR2018/002467.
Communication issued Feb. 9, 2023 by the Korean Intellectual Property Office in Korean Patent Application No. 10-2017-0178472.
Communication issued Mar. 27, 2023 by the Chinese National Intellectual Property Administration in Chinese Patent Application No. 201880082914.3.
Communication issued Jan. 4, 2024 by the State Intellectual Property Administration of P.R. China in Chinese Patent Application No. 201880082914.3.

* cited by examiner

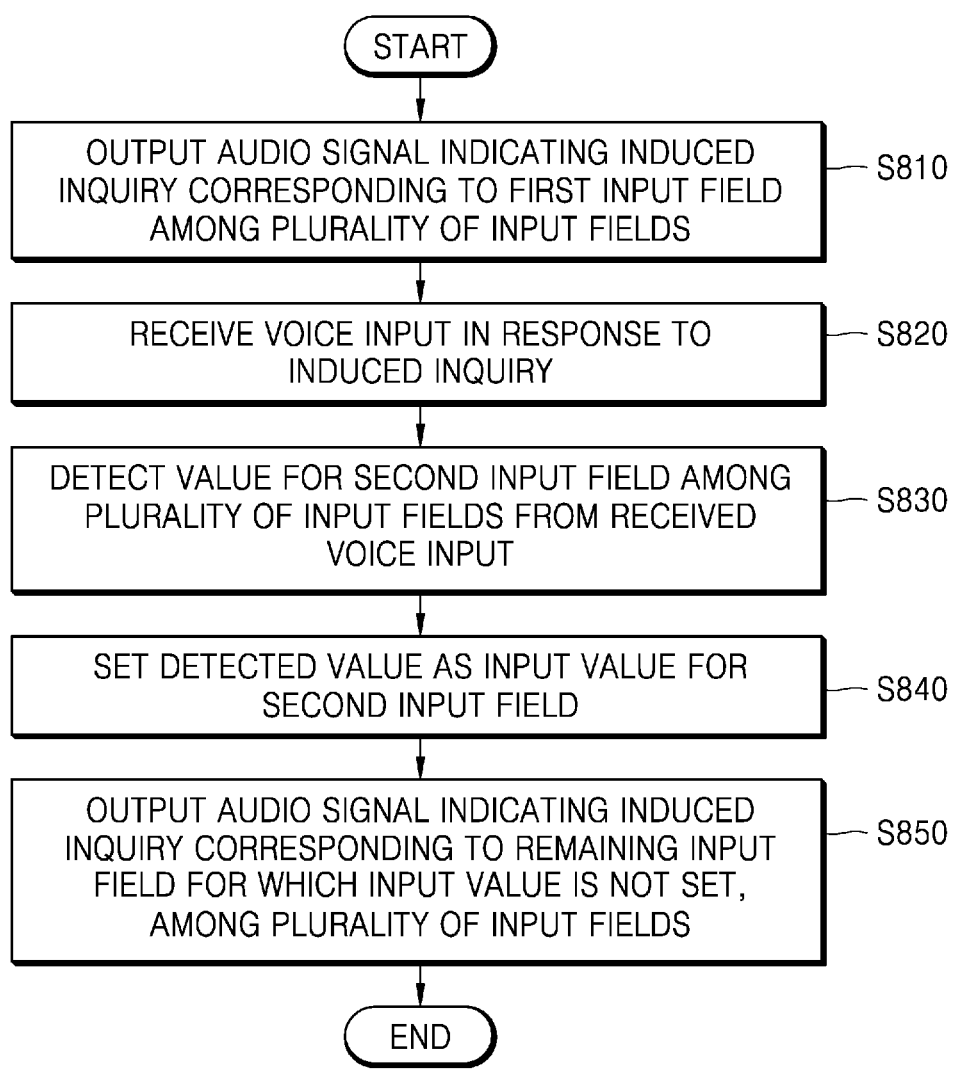

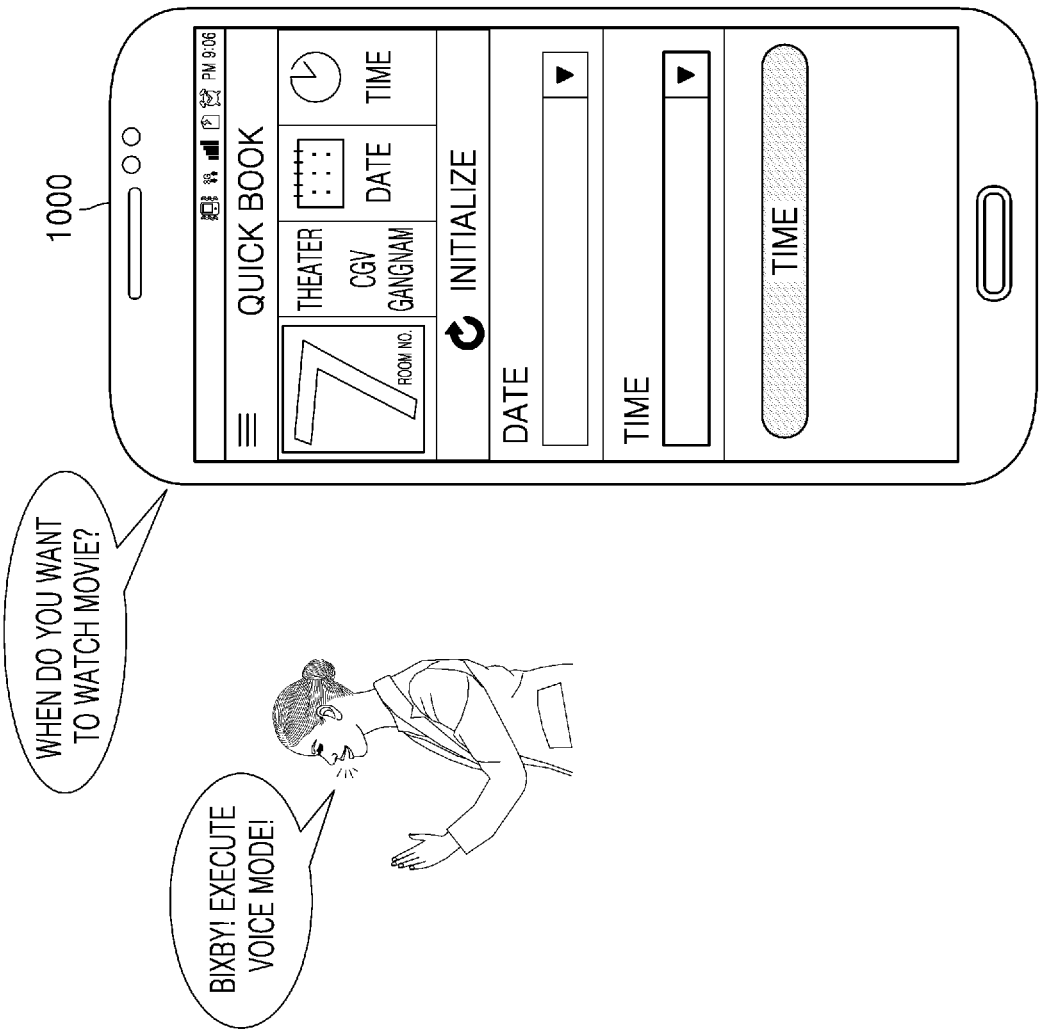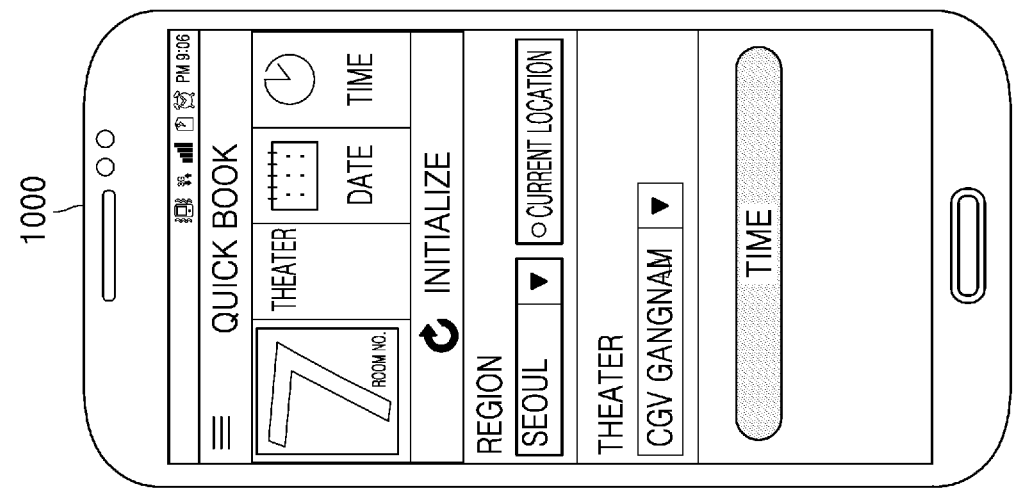

METHOD FOR EXECUTING APPLICATION AND APPARATUS THEREFOR

TECHNICAL FIELD

The present disclosure relates to a method and apparatus for executing an application based on a voice input of a user.

BACKGROUND ART

With the development of voice recognition techniques, various devices such as a voice recognition speaker, a mobile device, etc. have been configured to provide services by using voice recognition.

A device may receive a user input by using a voice recognition apparatus or by using an input device such as a touch panel or a mouse.

In this case, depending on a users situation, the user may select a different input method. For example, when the hands of the user are free, the user may control the device by using a touch on a screen or a mouse, and when the user is in a situation of being incapable of watching the device or manipulating the device by hand, the user may control the device by using a voice input.

However, when the user controls the device by using a voice input without watching the screen of the device, the user may not know which input is required for controlling the device.

In particular, since each application executed on a device has a different user interface and various values are selectable through the user interfaces, it is difficult for the user to control an application without watching the screen.

Even when the user may watch the screen, but may not manipulate the device by hand, the user has to control each user interface by using a voice input and thus a time used for controlling an application may be increased.

DESCRIPTION OF EMBODIMENTS

Solution to Problem

Various embodiments are provided to execute an application based on a voice input of a user.

BRIEF DESCRIPTION OF DRAWINGS

FIGS. 8, 9A, and 9B show a method, performed by a device, of determining an input value corresponding to a plurality of input fields when a user responds to an input value with respect to the other input field than an input field corresponding to an induced inquiry, regardless of the induced inquiry, according to some embodiments.

FIGS. 14A, 14B, 15A, and 15B show an example of switching to a method, performed by a device, of receiving an input value with respect to an input field based on user's selection, according to some embodiments.

BEST MODE

Figure 1B:
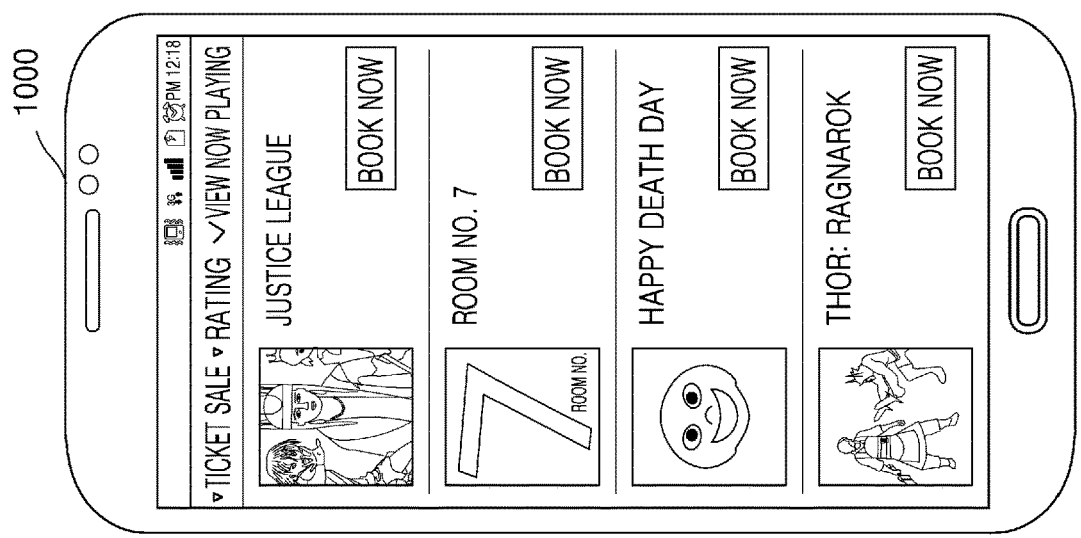
FIGS. 1A, 1B, 2A and 2B show a method, performed by a device, of executing an application, according to some embodiments.

A first aspect of the present disclosure provides a device for executing an application including a graphics user interface (GUI) for receiving an input value of an input field, the device including an audio output unit, a user input unit receiving a user input to request execution of the application, and a control unit configured to output, through the audio output unit, an audio signal indicating an induced inquiry corresponding to the input field, based on whether the user input is a voice input, to receive a voice input indicating a response to the induced inquiry, and to execute the application by setting an input value for the input field based on the voice input indicating the response to the induced inquiry.

The control unit may be further configured to output the audio signal indicating the induced inquiry corresponding to the input field when the user input to request execution of the application is a voice input, and not to output the audio signal indicating the induced inquiry corresponding to the input field when the user input is an input made through an icon of the application.

The control unit may be further configured to control the display unit to display a GUI including the input field, in addition to outputting the audio signal indicating the induced inquiry corresponding to the input field.

The application may include a plurality of pages to be displayed in an order, and the input field may include a first input field and a second input field, and the control unit may be further configured to, upon receipt of the voice input to request execution of the application, display a first page from among the plurality of pages and output an audio signal indicating an induced inquiry corresponding to an input field included in the first page, and upon determining an input value of the input field included in the first page, display a second page next to the first page and output an audio signal indicating an induced inquiry corresponding to an input field included in the second page.

The control unit may be further configured to set an input value for another input field based on the voice input, when the voice input indicating the response to the induced inquiry includes a response to the other input field in addition to the response to the input field from among the plurality of input fields.

The control unit may be further configured to, upon setting of an input value for the other input field, control the audio output unit to output an audio signal indicating an induced inquiry corresponding to the remaining input field except for the other input field from among the plurality of input fields.

The device may further include a communication unit configured to receive at least one value selectable as the input value of the input field from an external server, and the control unit may be further configured to determine the input value of the input field based on the received at least one value.

The control unit may be further configured to, upon receipt of the voice input to request execution of the application, output an audio signal indicating the induced inquiry corresponding to the input field, without displaying the GUI including the input field.

The application may include a plurality of input fields including the input field, and the plurality of input fields may include at least one essential input field that is essentially required for receiving a service executed by the application, and the control unit may be further configured to set an input value of the remaining input field to a preset default value without generating an induced inquiry regarding the remaining input field except for the at least one essential input field from among the plurality of input fields.

The control unit may be further configured to display at least one value inputtable to the input field and display a text indicating a voice keyword corresponding to the at least one value, while outputting the audio signal indicating the induced inquiry corresponding to the input field.

MODE OF DISCLOSURE

Terms used herein will be described in brief, and the disclosure will be described in detail.

Although terms used in the disclosure are selected with general terms popularly used at present under the consideration of functions in the disclosure, the terms may vary according to the intention of those of ordinary skill in the art, judicial precedents, or introduction of new technology. In addition, in a specific case, the applicant voluntarily may select terms, and in this case, the meaning of the terms is disclosed in a corresponding description part of the disclosure. Thus, the terms used in the disclosure should be defined not by the simple names of the terms but by the meaning of the terms and the contents throughout the disclosure.

Throughout the entirety of the specification of the disclosure, when it is assumed that a certain part includes a certain component, the term 'including' means that a corresponding component may further include other components unless a specific meaning opposed to the corresponding component is written. The term used in the embodiments of the disclosure such as "unit" or "module" indicates a unit for processing at least one function or operation, and may be implemented in hardware, software, or in a combination of hardware and software.

FIGS. 1A, 1B, 2A and 2B show a method, performed by a device 1000, of executing an application, according to some embodiments.

An application may include a graphics user interface (GUI) for receiving an input value of an input field. Thus, the device 1000 may determine the input value of the input field based on a user input received through the GUI.

The input field may mean a variable of an application, determined by the user. The device may receive a user input to input the input value of the input field and execute an application based on the input value, thus providing a service of the application.

For example, for a movie booking application, an input field may include a movie selection field, a theater selection field, a date and time selection field, a seat selection field, and a purchase information input field; for a search application, an input field may include a search word input field; and for an Internet shopping mall application, an input field may include a product name input field, an option selection field, a delivery information input field, and a purchase information input field.

The input value of the input field may be one of a plurality of values stored corresponding to the input field. For example, the device may display a drop-down menu for selecting one of the plurality of values stored corresponding to the input field and determine the input value of the input field upon receipt of a user input to select one of the plurality of values displayed on the drop-down menu.

The input value of the input field may be input directly by the user in the form of a text.

Figure 1A:
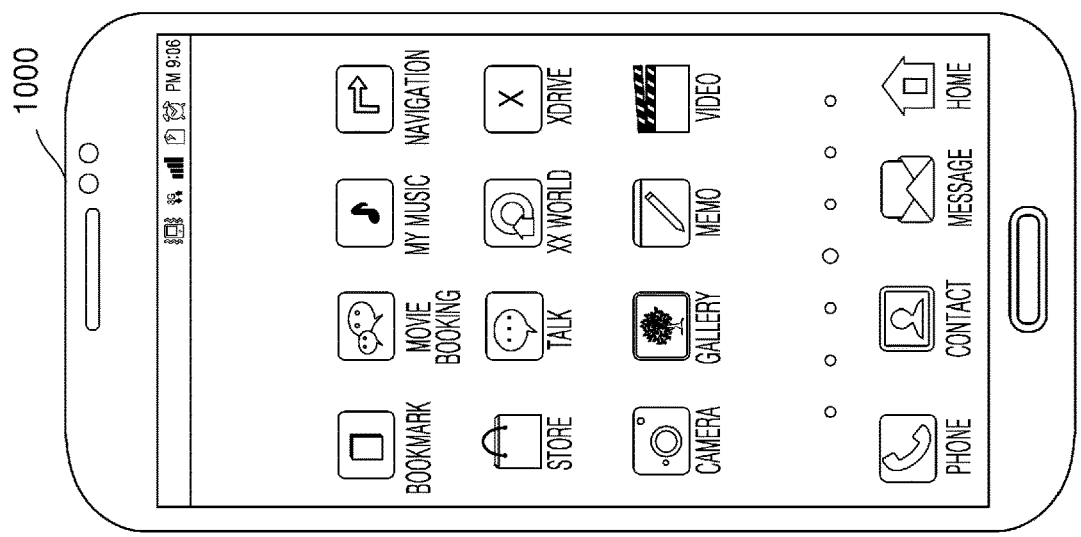

Referring to FIG. 1A, the device 1000 may receive a voice input to instruct execution of an application.

For example, the device 1000 may receive a voice input "Execute movie booking application!" in a state where the movie booking application is not executed.

Referring to FIG. 1B, upon receipt of the voice input to instruct execution of the application, the device 1000 may output an audio signal indicating an induced inquiry corresponding to the input field of the application.

For example, upon receipt of the voice input "Execute a movie booking application!", the device 1000 may output an audio signal indicating an induced inquiry corresponding to the movie selection field, "Which movie do you want to watch?".

As the device 1000 receives a voice input including a movie title from the user in response to the induced inquiry, the device 1000 may determine the received movie title as an input value of the movie selection field.

A situation where the user executes an application with a voice input may correspond to a situation where the user is far away from the device 1000 or has difficulty in manipulating the device 1000 by hand, such that when the user executes the application with the voice input, the device 1000 may provide the induced inquiry for manipulating the application, thereby providing a service to the user even in a situation where the user is not capable of manipulating the device 1000.

Figure 2A:
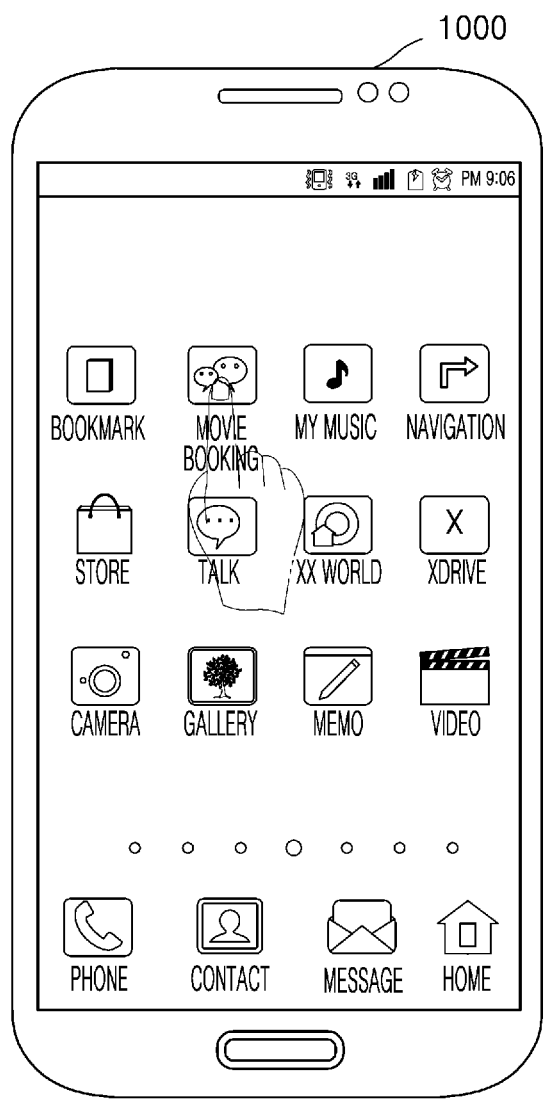

Referring to FIG. 2A, the device 1000 may receive a user input to execute an application.

For example, the device 1000 may receive a user input to touch or click the movie booking application.

Figure 2B:
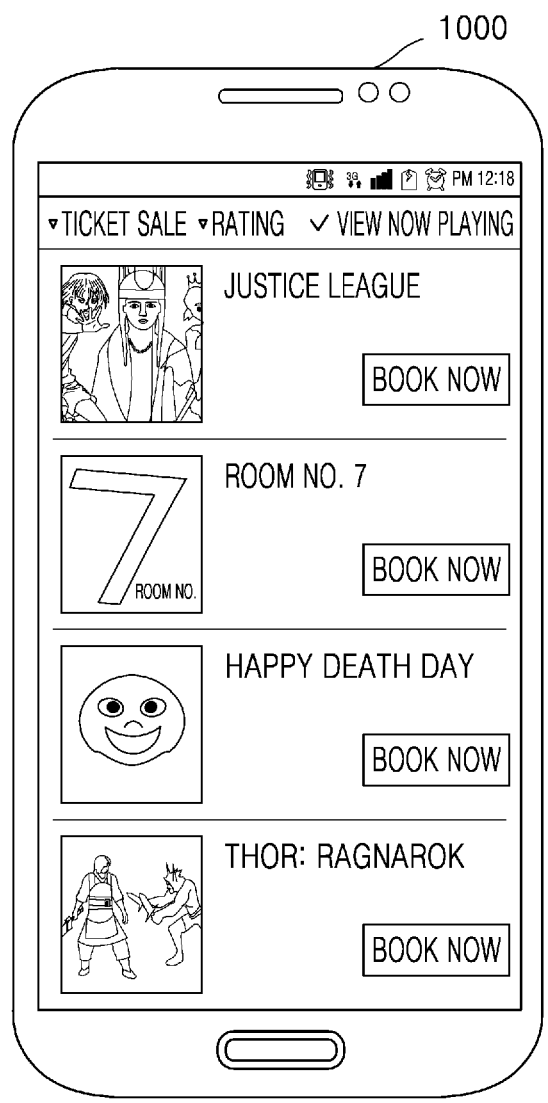

Referring to FIG. 2B, upon receipt of the user input to execute the application, the device 1000 may display a GUI of the application without outputting an audio signal indicating an induced inquiry corresponding to the input field of the application.

A situation where the user executes the application with a touch input may correspond to a situation where the user is capable of manipulating the device 1000 directly by hand, such that the device 1000 may not output an audio signal indicating an induced inquiry.

Figure 3:
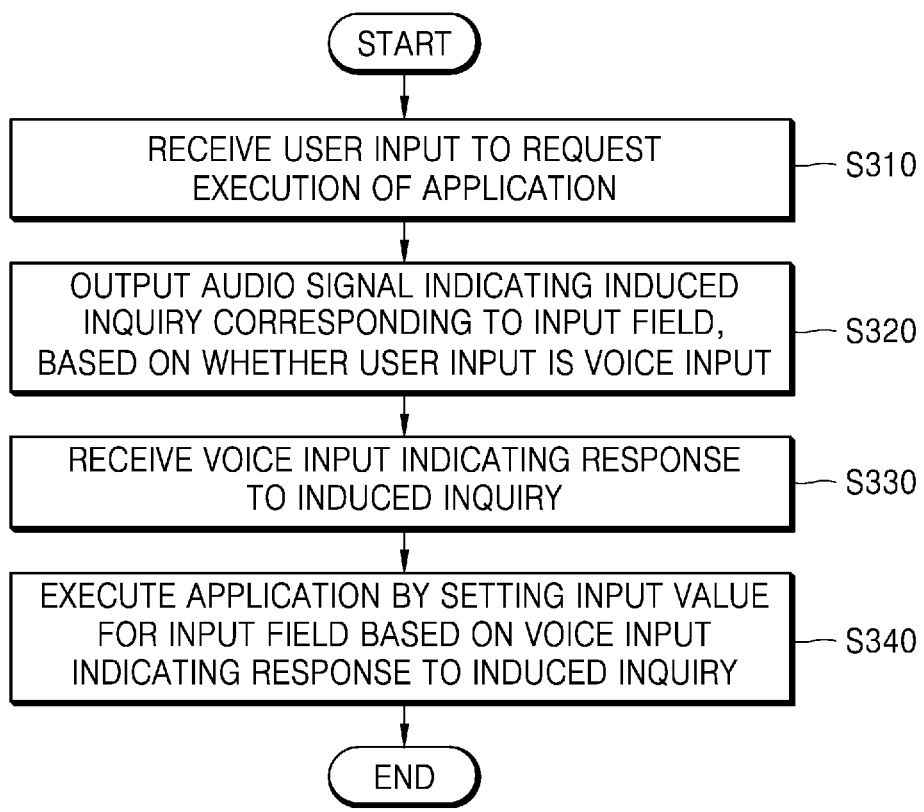
FIG. 3 is a flowchart of a method, performed by a device, of executing an application, according to some embodiments.

FIG. 3 is a flowchart of a method, performed by the device 1000, of executing an application, according to some embodiments.

In operation S310, the device 1000 may receive a user input to request execution of the application.

The device 1000 may receive a voice input to request execution of the application. The device 1000 may receive a voice input to request execution of the application in a state where the application is not executed, and may receive a voice input to request execution of the application in a state where the application is being executed.

The voice input may be, for example, "Execute movie booking application!" for the moving booking application, or "Book movie!" that does not indicate a request for execution of the application.

The device 1000 may display an icon of an application on a home screen and start execution of an application upon receipt of a user input to select the icon.

In operation S320, the device 1000 may output an audio signal indicating an induced inquiry corresponding to an input field, based on whether the user input is a voice input.

The device 1000 may output the audio signal indicating the induced inquiry corresponding to the input field, when the user input requesting execution of the application is the voice input.

The induced inquiry may be stored as data corresponding to the input field in the device 1000. One induced inquiry may be stored corresponding to one input field, and one induced inquiry may be stored corresponding to a plurality of input fields. For example, one induced inquiry "When do you want to watch movie?" may be stored corresponding to a date and time selection field.

The induced inquiry may be an interrogative sentence including an interrogative. The interrogative sentence including the interrogative may include who, when, where, what, how, how much, how many, and why.

Thus, when there are many values inputtable to the input field, a response may be received from the user merely with a simple question without listing all of the inputtable values.

According to an embodiment, the device 1000 may output an audio signal indicating values inputtable to the input field, together with the induced inquiry corresponding to the input field.

The application may also include a plurality of input fields. The plurality of input fields may include an essential input field that is essentially needed for an application to provide a service and an additional input field that is not essentially needed for an application to provide a service, but is needed for an additional service. For example, for the movie booking application, the essential input field may include a movie selection field, a theater selection field, a date and time selection field, a seat selection field, and a purchase information input field, and the additional input field may include an input field regarding whether to buy a drink together. In this case, the device 1000 may generate an induced inquiry only for the essential input field and may set a default value as an input value for the additional input field.

The device 1000 may display a GUI for receiving the input value of the input field and output an audio signal indicating an induced inquiry corresponding to the input field. The device 1000 may output only the audio signal indicating the induced inquiry corresponding to the input field without displaying the GUI for receiving the input value of the input field.

When the application includes a plurality of pages and a display order of the plurality of pages is set, the device 1000 may sequentially display the plurality of pages in the display order and output an audio signal indicating an induced inquiry corresponding to a displayed page.

For example, the device 1000 may display a first page from among the plurality of pages, output an audio signal indicating an induced inquiry corresponding to an input field included in the first page, display a second page next to the first page upon determining an input value of the input field in the first page based on a user's response, and output an audio signal indicating an induced inquiry corresponding to an input field included in the second page.

Thus, the user may set the input value of the input field without searching for the current page, even when the user controls the device 1000 with a touch or a click during control of the device 1000 with a voice input. In a situation where the user is capable of watching the device 1000, but is incapable of manipulating the device 1000 by band, the user may easily and accurately select an input value because the user may watch information about an input field in which the current input value is set. This embodiment will be described later with reference to FIGS. 4 and 5.

In addition, when the user input to request execution of the application is an input made through the icon of the application, the device 1000 may display the GUI of the application without outputting the audio signal indicating the induced inquiry corresponding to the input field.

When the user executes the application by using a touch or a mouse, which may correspond to a situation where the user is capable of controlling the device 1000 by hand, the device 1000 may display the GUI of the application without outputting the induced inquiry.

In operation S330, the device 1000 may receive a voice input indicating a response to the induced inquiry.

The voice input indicating the response to the induced inquiry may include the input value of the input field corresponding to the output induced inquiry, and may include an input value of an input field other than the input field corresponding to the output induced inquiry.

In operation S340, the device 1000 may execute the application by setting the input value of the input field based on the voice input indicating the response to the induced inquiry.

The device 1000 may determine a text indicated by the voice input by performing voice recognition on the voice input indicating the response to the induced inquiry, and may determine an input value corresponding to the input field by detecting an input value to be set in the input field from the determined text.

The device 1000 may perform voice recognition based on the values inputtable to the input field, when determining the text indicated by the voice input by performing voice recognition on the voice input indicating the response to the induced inquiry. For example, when the values inputtable to the input field are "Room No. 7", "The Outlaws", and "Heart Blackened", the device 1000 may perform voice recognition on the assumption that there is a high probability that the voice input indicating the response to the induced inquiry includes one of "Room No. 7", "The Outlaws", and "Heart Blackened" among words.

By receiving a value inputtable to the input field from an external server in real time and performing voice recognition on the voice input indicating the response to the induced inquiry based on the received value, the device 1000 may determine an input value corresponding to the input field.

Depending on an embodiment, the device 1000 may determine whether the voice input includes an input value of another input field in addition to the input value of the input field corresponding to the output induced inquiry. For example, even when the device 1000 outputs the induced inquiry corresponding to one input field, the device 1000 may detect input values for a plurality of input values included in an application from the voice input and set the detected input values in input fields corresponding to the respective input values.

Thus, even when the user says what the user thinks rather than the response to the induced inquiry, the device 1000 may detect input values intended by the user from the response of the user. This embodiment will be described later with reference to FIGS. 8A and 8B.

When the device 1000 receives an input value of another input field other than the input value of the input field corresponding to the output induced inquiry, the device 1000 may output only an induced inquiry corresponding to the other input field, which is not set, among the plurality of input fields of the application.

FIGS. 4, 5A, 5B, and 5C show a method, performed by the device 1000, of outputting an induced inquiry regarding an input field in a page order, according to some embodiments.

Figure 4:
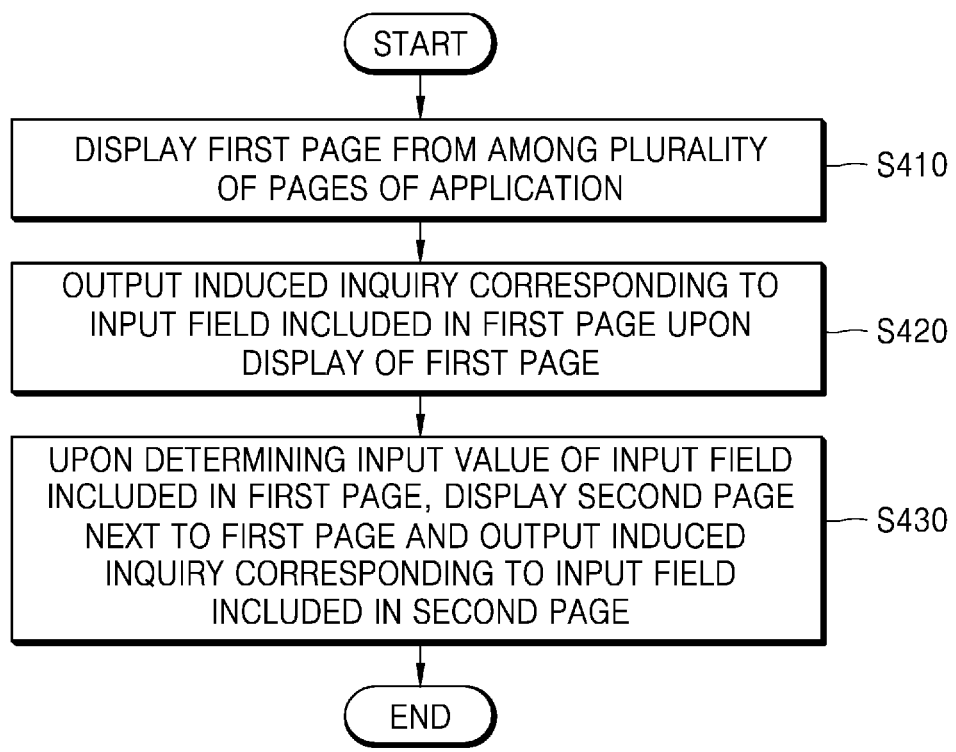
FIGS. 4, 5A, 5B, and 5C show a method, performed by a device, of outputting an induced inquiry regarding an input field in a page order, according to some embodiments.

In operation S410 of FIG. 4, the device 1000 may display a first page from among the plurality of pages of the application.

The application may also include the plurality of pages. For example, referring to FIG. 5, in the movie booking application, a first page 510 may be a page for selecting a movie, a second page 520 may be a page for selecting a theater, a third page 530 may be a page for selecting a date and a time, and a fourth page may be a page for inputting payment information.

In operation S420, the device 1000 may output an induced inquiry corresponding to an input field included in the first page as displaying the first page.

The device 1000 may display the first page 510 of the application and output an audio signal indicating an induced inquiry corresponding to a movie selection field included in the first page 510. For example, when an induced inquiry "Which movie do you want to watch?" is stored corresponding to the movie selection field, the device 1000 may output the induced inquiry "Which movie do you want to watch?".

In operation S430, as the input value of the input field included in the first page is determined, the device 1000 may display a second page next to the first page and output an induced inquiry corresponding to an input field included in the second page.

Figure 5C:
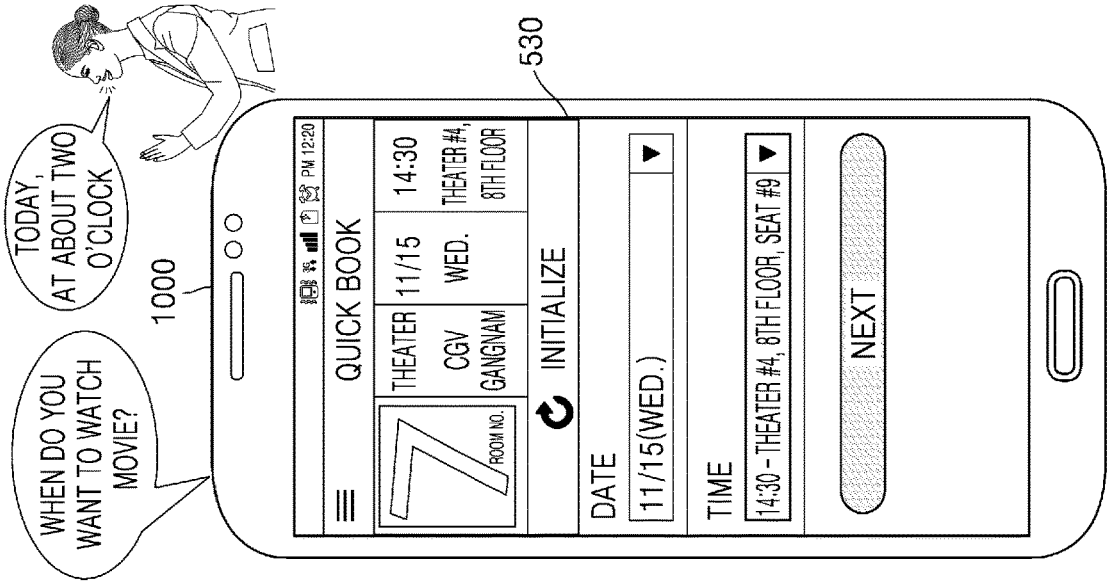
Figure 5B:
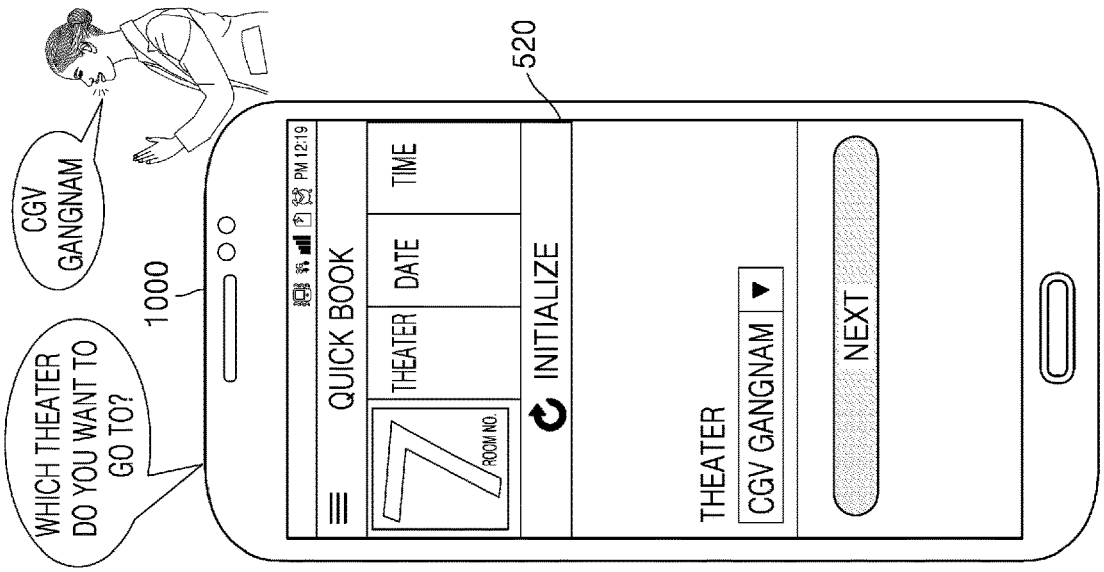
Figure 5A:
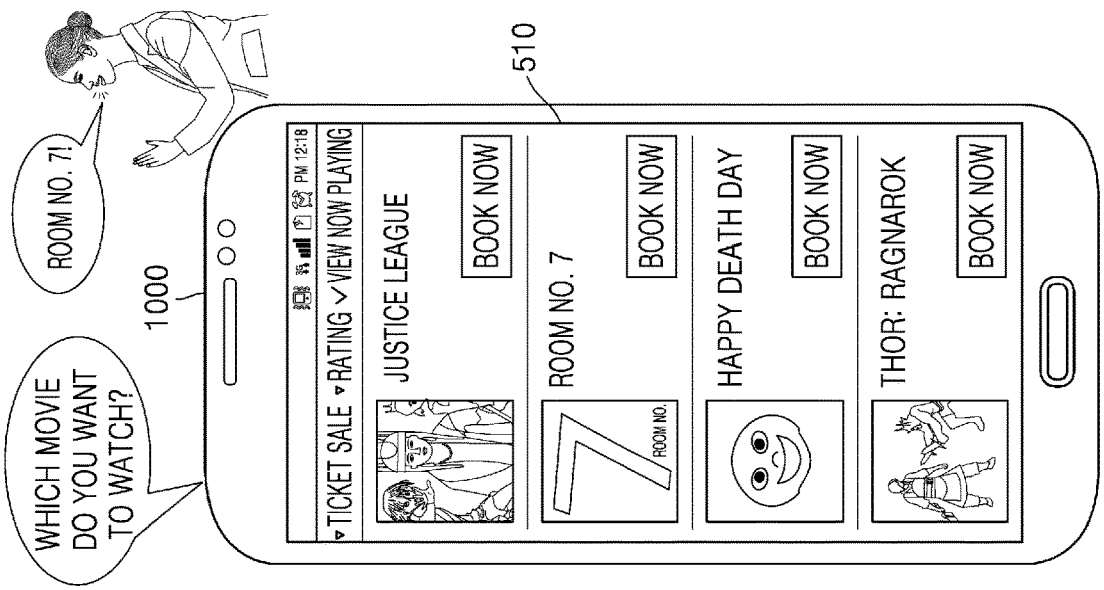

For example, referring to FIG. 5A, upon receipt of a first response "Room No. 7!", the device 1000 may determine "Room No. 7" among a plurality of movies as the input value of the movie selection field.

Referring to FIG. 5B, as the input value of the input field included in the first page 510 is determined, the device 1000 may display the second page 520 and output an audio signal indicating an induced inquiry corresponding to the theater selection field included in the second page 520. For example, when an induced inquiry "Which theater do you want to go to?" is stored corresponding to the theater selection field, the device 1000 may output the induced inquiry "Which theater do you want to go to?".

Upon receipt of a second response "CGV Gangnam" in response to the induced inquiry corresponding to the theater selection field, the device 1000 may determine "CGV Gangnam" as the input value of the theater selection field from among a plurality of theaters.

Referring to FIG. 5C, as the input value of the input field included in the second page 520 is determined, the device 1000 may display a third page 530 and output an audio signal corresponding to the date and time selection field included in the third page 530.

As all of the input values of the input fields included in the plurality of pages 510 through 530 are determined, the device 1000 may provide the movie booking service based on the input values.

Thus, even when the user controls the device 1000 again with a touch or a click during control with a voice input, and even when the user is capable of seeing the device 1000, but is incapable of manipulating the device 1000 by hand, the user may easily and accurately select an input value.

Figure 6A:
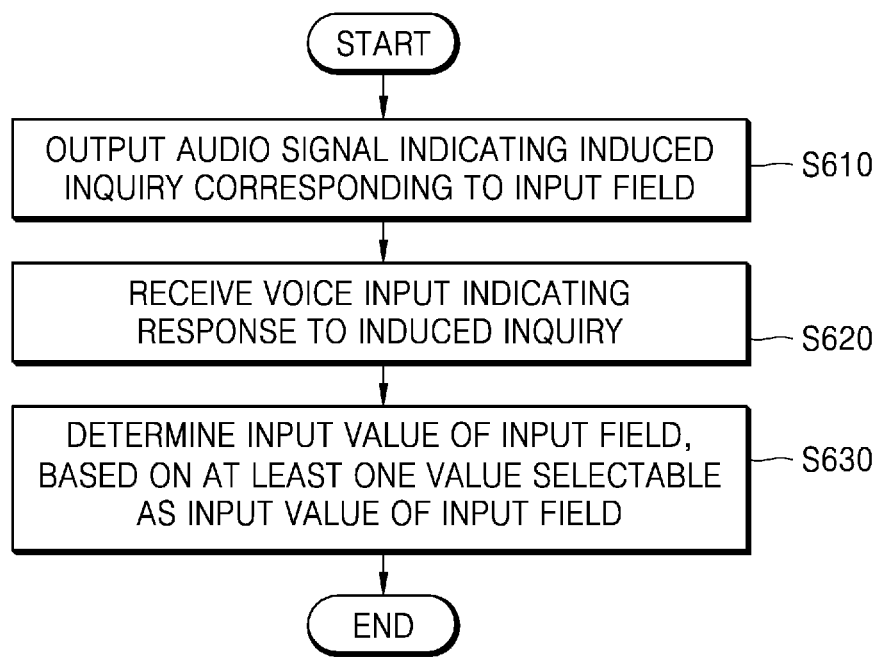
FIGS. 6A and 6B show a method, performed by a device, of performing voice recognition based on values inputtable to an input field, according to some embodiments.
Figure 6B:
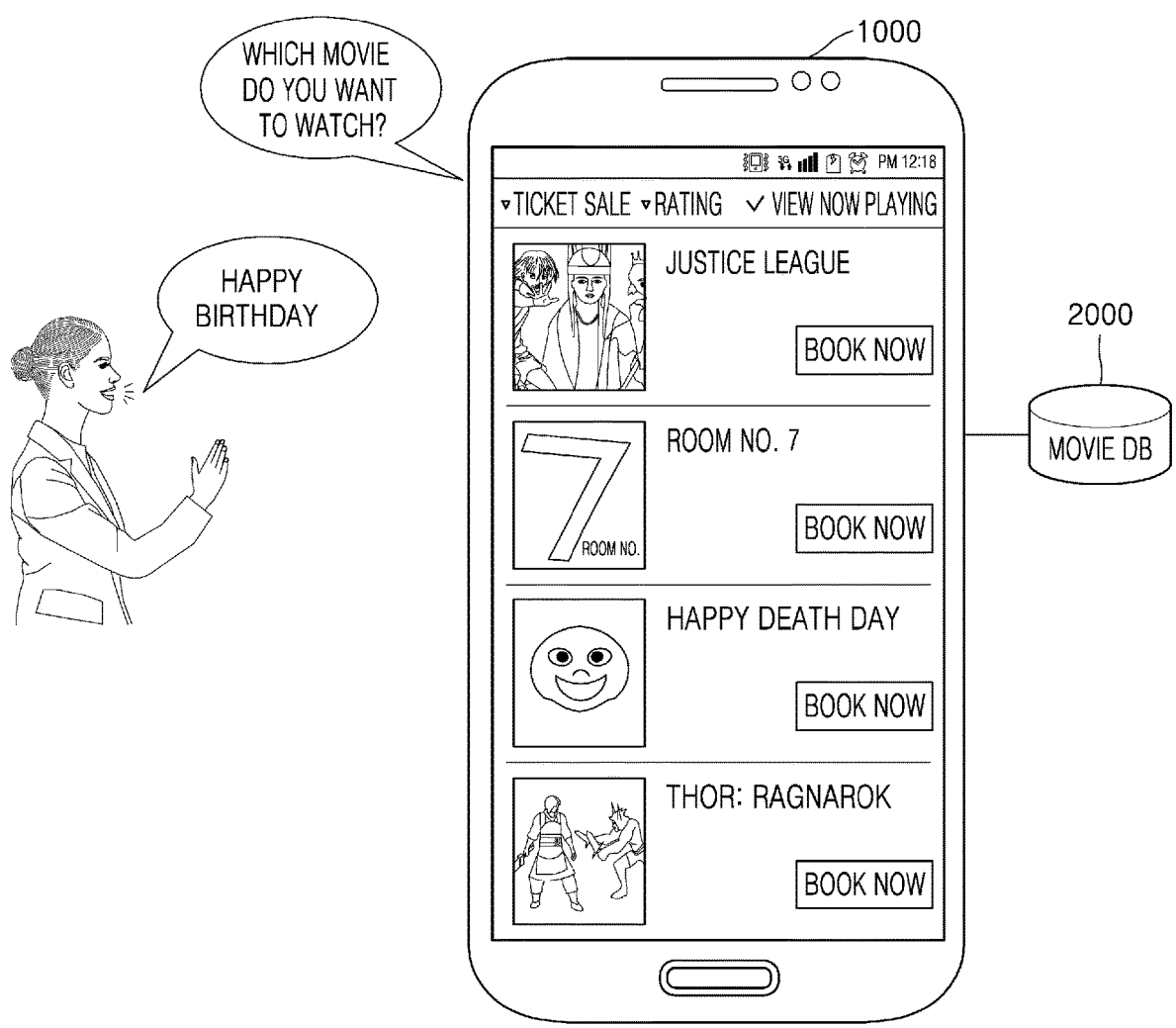

FIGS. 6A and 6B show a method, performed by the device 1000, of performing voice recognition based on values inputtable to an input field, according to some embodiments.

In operation S610 of FIG. 6A, the device 1000 may output an audio signal indicating an induced inquiry corresponding to an input field. In operation S620, the device 1000 may receive a voice input indicating a response to the induced inquiry. Operations S610 and S620 may be described with reference to operations S320 and S330 of FIG. 3.

In operation S630, the device 1000 may determine an input value of the input field based on at least one value selectable as the input value of the input field.

The device 1000 may store the at least one value selectable as the input value for each input field. For example, for an input field for which an input value is selected using a drop-down menu, the device 1000 may have stored a plurality of values displayed when the drop-down menu is clicked.

Referring to FIG. 6B, the device 1000 may receive the at least one value selectable as the input value from an external device for each input field. For example, the device 1000 may request a value inputtable to an input field from a database 2000. The database 2000 may be an external server. The database 2000 may communicate with the device 1000 through a broadband network such as Internet or through a local area network (LAN). The device 1000 may store a link address of the database 2000 for an input field.

The device 1000 may request a value inputtable to an input field from the database 2000 corresponding to the input field. For example, for the movie booking application, the database 2000 may be a movie information database 2000. In this case, the device 1000 may request values inputtable as a selection value of the movie selection field from the movie information database 2000. The device 1000 may receive the values inputtable as the selection value of the movie selection field from the movie information database 2000.

The device 1000 may determine the input value of the input field by executing voice recognition on a voice input based on the values inputtable to the input field.

For example, the device 1000 may perform voice recognition based on the values inputtable to the input field, when determining the text indicated by the response by performing voice recognition on the response to the induced inquiry. For example, the device 1000 may set a probability of the received values being detected to be higher than a probability of other words being detected, when the device 1000 detects a word from the response.

For example, referring to FIG. 6B, when a movie list received from a movie database includes "Justice League", "Room No.7", "Happy Death Day", "Thor: Ragnarok", and "Loving Vincent", and a user's response to an induced inquiry corresponding to the movie selection field, "Which movie do you want to watch?" is "Happy Birthday", then the device 1000 may determine that a text indicated by the response is "Happy Death Day" instead of "Happy Birthday".

After the device 1000 determines that the text indicated by the response is "Happy Birthday", the device 1000 may compare "Happy Birthday" with a plurality of values selectable as an input value of the movie selection field, thus determining the most similar value "Happy Death Day" as the input value of the movie selection field.

Depending on an embodiment, the device 1000 may output a voice signal for determining whether the determined input value corresponds to a user-intended input value. For example, the device 1000 may output a voice signal "Book Happy Death Day?".

For example, the device 1000 may receive a voice input "Today, 2:30" as a response to an induced inquiry "When do you want to watch the movie?" in the movie booking application. The device 1000 may determine November 15$^{th}$ as an input value of the date selection field based on a word "Today", and 2:30 as an input value of the time selection field based on a word "2:30".

As the input value of the input field is determined, the device 1000 may output an audio signal indicating "Movie Starting at 2:30 on Wednesday, 15$^{th}$ is Selected." The device 1000 may display identification information and the selected date, 15th, of the date selection field and identification information and the selected time, 2:30, of the time selection field on a display screen. Upon receipt of one response including input values for a plurality of input fields included in a plurality of pages, the device 1000 may sequentially display each page and an input value for an input field included in each page.

Thus, the device 1000 may recognize user's intention more accurately, and may provide a fast and accurate service by limiting a text indicated by the response to a value inputtable to an input field depending on a circumstance.

Figure 7:
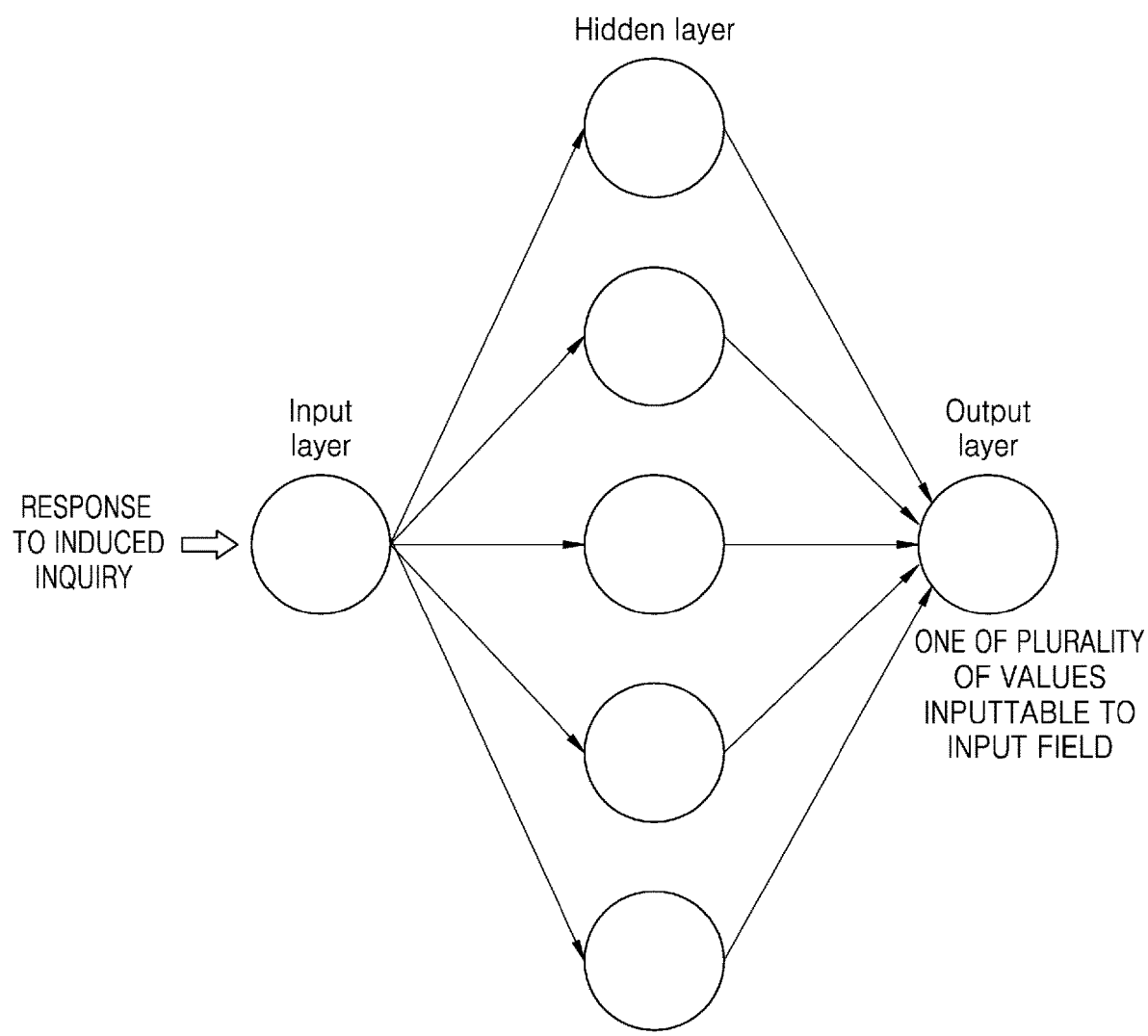
FIG. 7 shows a method, performed by a device, of determining an input value of an input field by using artificial intelligence, according to some embodiments.

FIG. 7 shows a method, performed by the device 1000, of determining an input value of an input field by using artificial intelligence, according to some embodiments.

Referring to FIG. 7, the device 1000 may determine an input value of an input field by using a neural network algorithm.

When values inputtable to one input field are determined, the device 1000 may train a neural network to output an input value to be input to an input field when a user's response to an induced inquiry is set as an input of the neural network.

Upon receipt of a voice input indicating the user's response to the induced inquiry, the device 1000 may convert the voice input into a text. The device 1000 may detect a text, which is similar to values inputtable as an input value of an input field, from the converted user's response. For example, when the values inputtable to the movie selection field are "Justice League", "Room No.7", "Happy Death Day", "Thor: Ragnarok", and "Loving Vincent", and the received user's response is "Book Happy Birthday.", then the device 1000 may compare the user's response with each movie title and detect "Happy Birthday" as a text that is similar by a threshold value or more.

The device 1000 may determine an output value, which is output when "Happy Birthday" is input as an input of the neural network, as the input value for the input field.

As the device 1000 outputs a voice signal indicating a question for determining whether the determined input value corresponds to the user-intended input value and receives a response to the question, the device 1000 may train the neural network based on the user's response. For example, when the output value of the neural network is "Happy Death Day" and it is determined that "Happy Death Day" is not the user-intended movie, the device 1000 may train the neural network not to output "Happy Death Day" as the output value of the neural network when the voice input "Book Happy Birthday." is input as the input of the neural network.

A function of determining the input value of the input field by using artificial intelligence may be performed by a server connected with the device 1000, and the server may receive various responses of a plurality of users with respect to an induced inquiry, such that the device 1000 may accurately provide a service.

Figure 9B:
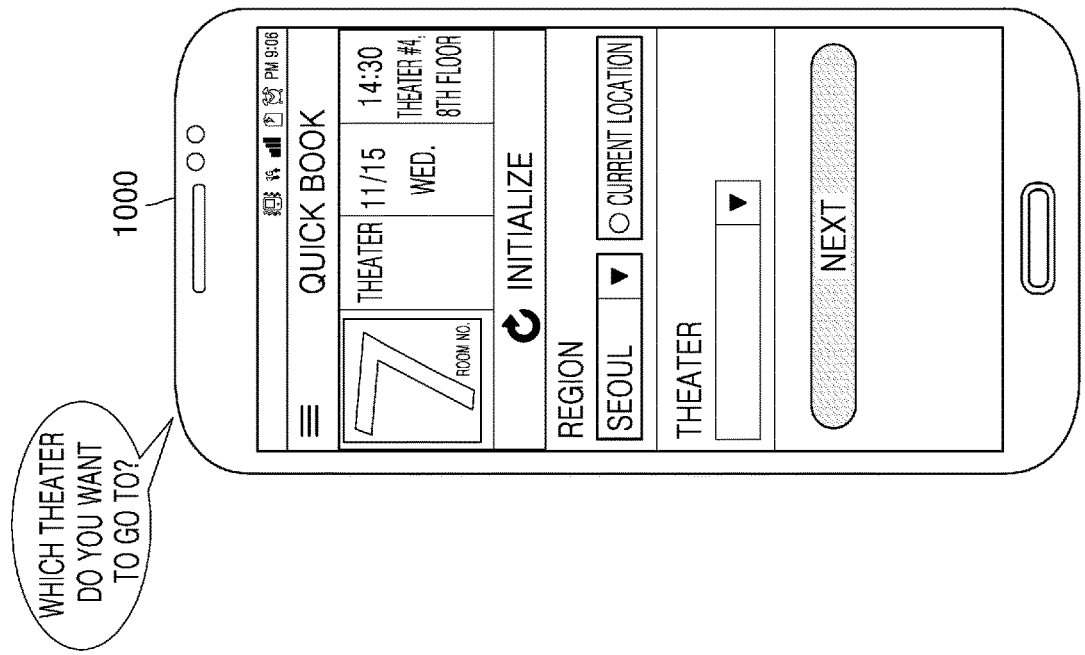
Figure 9A:
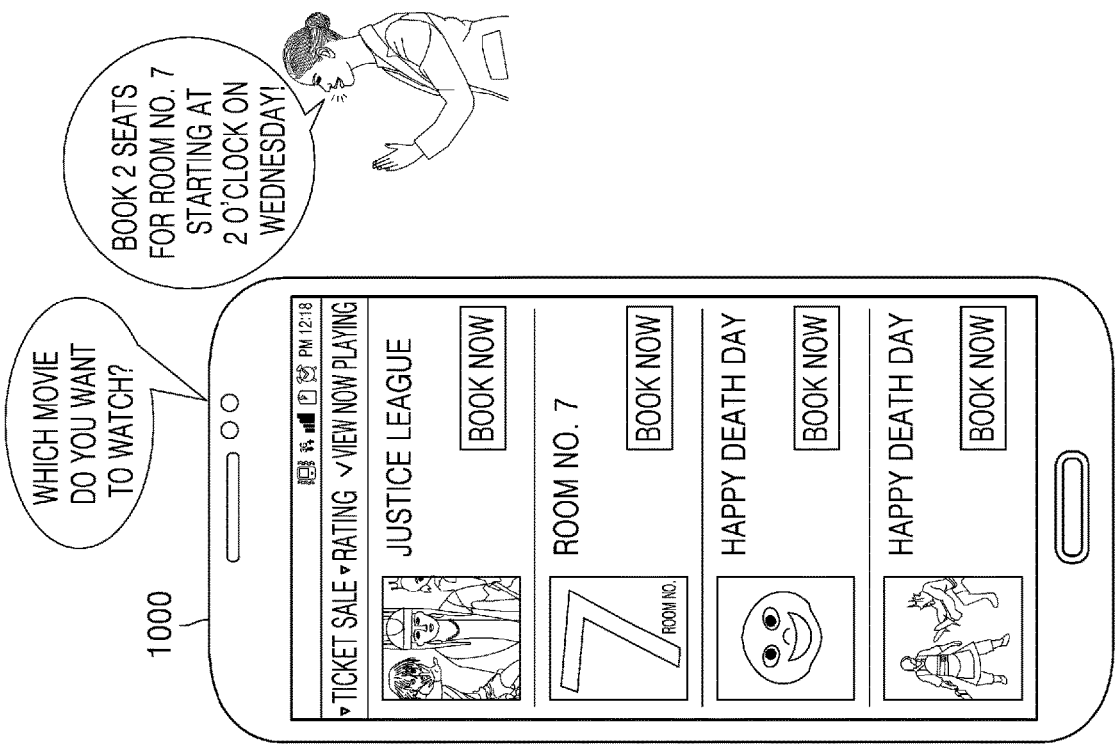

FIGS. 8, 9A, and 9B show a method, performed by the device 1000, of determining an input value corresponding to a plurality of input fields when the user responds to an input value with respect to the other input field than an input field corresponding to an induced inquiry, regardless of the induced inquiry, according to some embodiments.

In operation S810, the device 1000 may output an audio signal indicating an induced inquiry corresponding to a first input field among a plurality of input fields.

The device 1000 may execute an application including a plurality of input fields. The device 1000 may output the audio signal indicating the induced inquiry corresponding to the first input field, upon receipt of a voice input requesting execution of the application or during execution of the application.

In operation S820, the device 1000 may receive a voice input indicating a response to the induced inquiry.

When the user previously knows an input field of the application, the user may speak input values for previously known input fields at random.

For example, referring to FIG. 9A, when the device 1000 outputs the induced inquiry "Which movie do you want to watch?" corresponding to the movie selection field, the device 1000 may receive a response "Book two seats for Room No.7 starting at 2:00 on Saturday!"

In operation S830, the device 1000 may detect a value for a second input field among the plurality of input fields from the received voice input.

The device 1000 may detect a value for the second input field instead of the first input field corresponding to the induced inquiry. The device 1000 may also detect the value for the second input field, together with the value for the first input field corresponding to the induced inquiry.

For example, the device 1000 may detect a value for the time selection field, "2:00 on Saturday" and a value for the seat selection field, "two seats", in addition to a value for the movie selection field that is the first input field, "Room No. 7".

The device 1000 may detect the value for the second input field in addition to the first input field, from the voice input, by comparing values inputtable corresponding to each of the plurality of input fields with the received voice input.

In operation S840, the device 1000 may set the detected value as the input value for the second input field.

For example, the device 1000 may set a value for the movie selection field that is the first input field, "Room No. 7", as the input value of the movie selection field, and may also set "2:00 on Saturday" as the input value for the time selection field and "two seats" as the input value for the seat selection field.

In operation S850, the device 1000 may output an audio signal indicating an induced inquiry corresponding to the other input field for which an input value is not set among the plurality of input fields.

When the input values for the first input field and the second input field are set, the device 1000 may output an audio signal indicating an induced inquiry corresponding to at least one of the other input fields than the first input field and the second input field among the plurality of input fields.

For example, referring to FIG. 9B, the device 1000 may output an induced inquiry "Which theater do you want to go to?" corresponding to the theater selection field among the other input fields except for the movie selection field, the time selection field, and the seat selection field among the plurality of input fields.

Thus, the user may input a desired value for a known input field at a time at random without sequentially inputting an input value in an order of pages or input fields of an application.

Figure 10A:
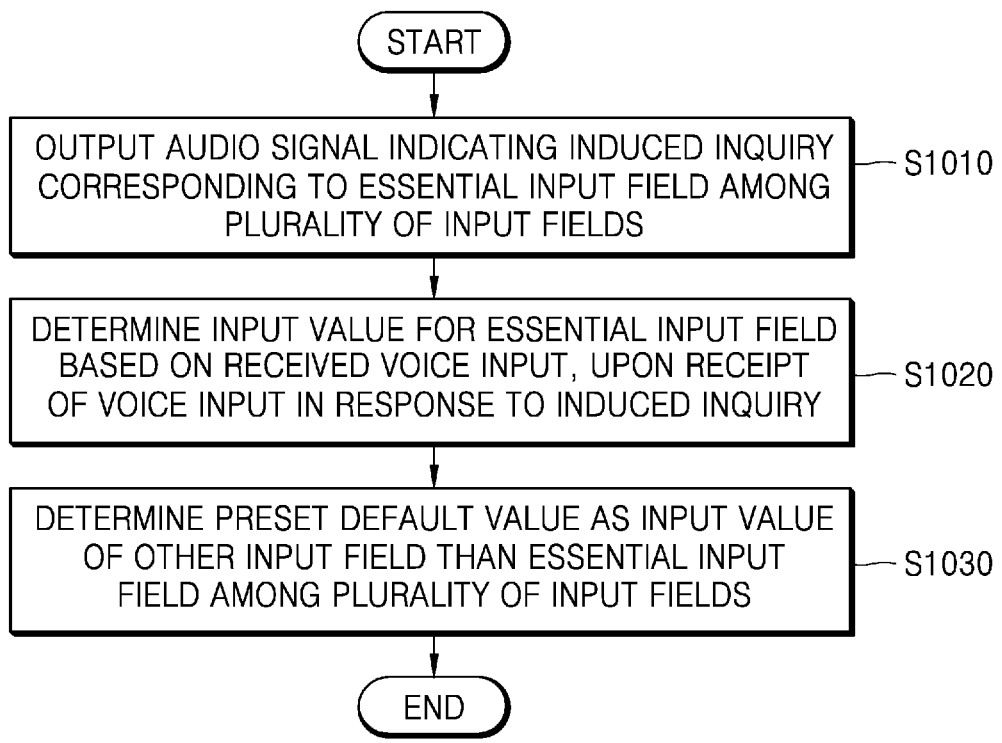
FIGS. 10A and 10B show a method, performed by a device, of setting an input value with respect to an input field having a low importance, according to some embodiments.
Figure 10B:
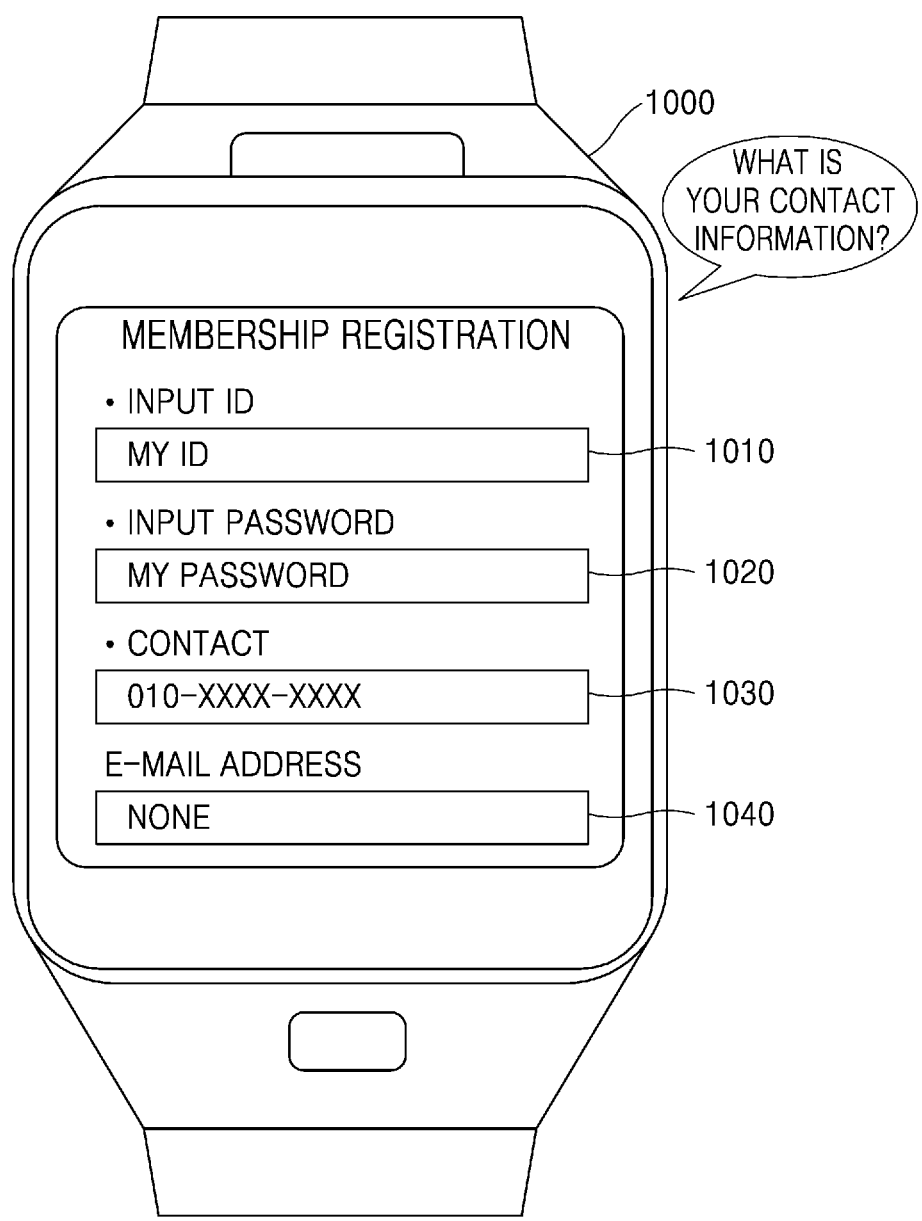

FIGS. 10A and 10B show a method, performed by the device 1000, of setting an input value with respect to an input field having a low importance, according to some embodiments.

In operation S1010 of FIG. 10A, the device 1000 may output an audio signal indicating an induced inquiry corresponding to an essential input field among a plurality of input fields.

The plurality of input fields of the application may include an essential input field that is essentially needed for an application to provide a service and an additional input field that is not the essential input field, but is required for obtaining additional information.

For example, referring to FIG. 10B, the application may include a membership registration function. In this case, an identification (ID) input field 1010, a password input field 1020, and a contact input field 1030 may be essential input fields for a membership registration service. However, an e-mail address is not essentially required for the membership registration service, and thus an e-mail address input field 1040 may be an additional input field.

In operation S1020, upon receipt of a voice input in response to an induced inquiry, the device 1000 may determine an input value for an essential input field based on the received voice input.

In operation S1030, the device 1000 may determine a preset default value as an input value of the other input field than the essential input field among a plurality of input fields.

For example, the device 1000 may determine the default value corresponding to the additional input field as an input value of the additional input field, without outputting an induced inquiry corresponding to the additional input field that is not an essential input field among the plurality of input fields of the application.

For example, referring to FIG. 10B, the device 1000 may determine "no input" as an input value corresponding to the e-mail address input field 1040.

Figure 11A:
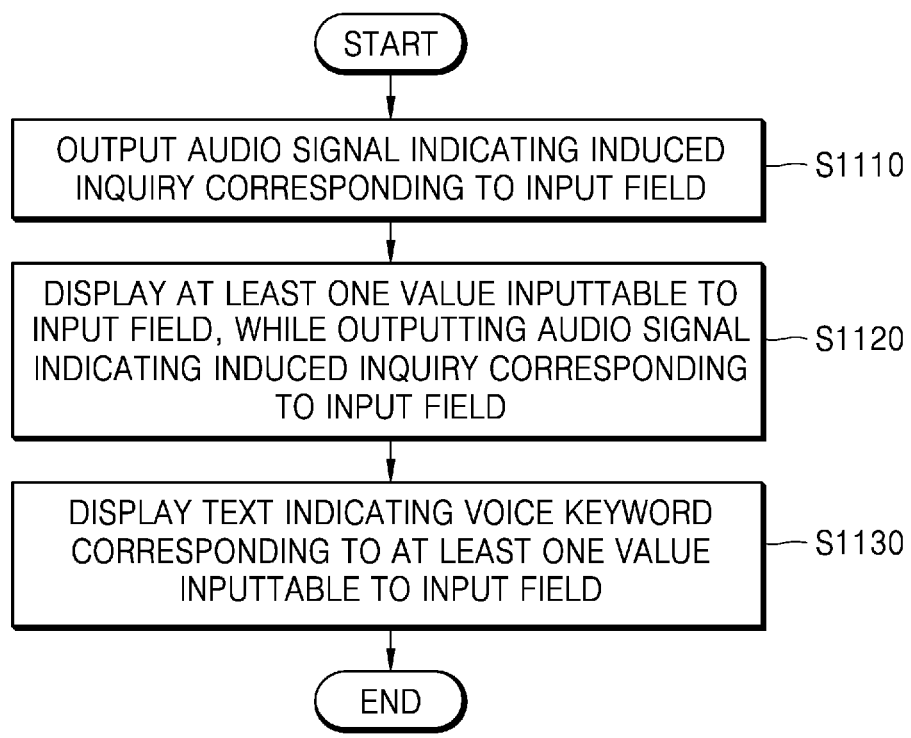
FIGS. 11A and 11B show a method, performed by a device, of displaying values inputtable to an input field while outputting an audio signal indicating an induced inquiry corresponding to an input field, according to some embodiments.
Figure 11B:
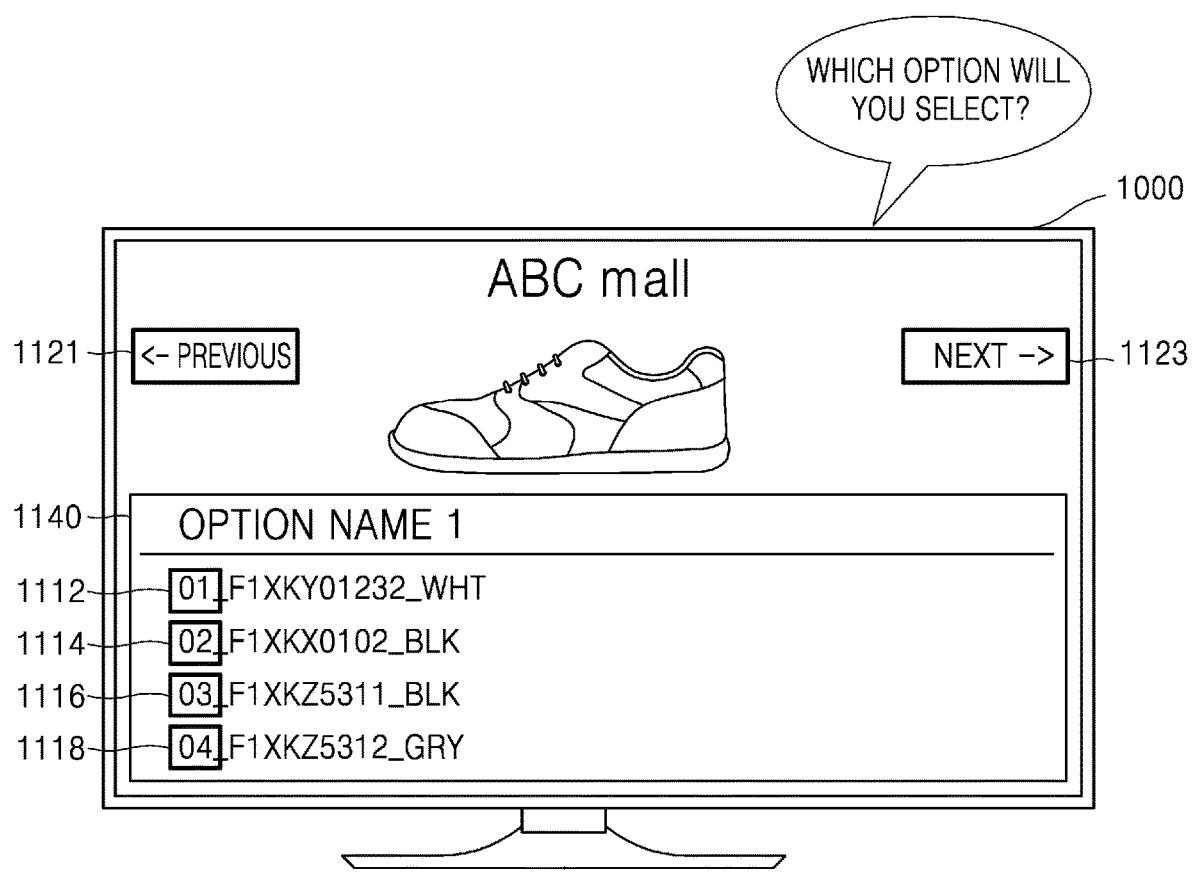

FIGS. 11A and 11B show a method, performed by the device 1000, of displaying values inputtable to an input field while outputting an audio signal indicating an induced inquiry corresponding to an input field, according to some embodiments.

In operation S1110 of FIG. 11A, the device 1000 may output an audio signal indicating an induced inquiry corresponding to an input field.

For example, referring to FIG. 11B, the device 1000 may execute an Internet shopping application. The device 1000 may select running shoes and receive a user input for buying the selected running shoes. Upon receipt of a user input to buy the selected running shoes, the device 1000 may output an audio signal indicating an induced inquiry corresponding to an option selection field for selecting an option regarding the selected running shoes. For example, the device 1000 may output a voice signal "Which option will you select?".

In operation S1120, the device 1000 may display at least one value inputtable to an input field, while outputting an audio signal indicating an induced inquiry corresponding to the input field.

For example, referring to FIG. 11B, the device 1000 may display at least one value 1140 inputtable to the option selection field, together with outputting the audio signal indicating the induced inquiry corresponding to the option selection field. The at least one value 1140 inputtable to the option selection may be at least one selection item that is preset corresponding to the option selection field. For example, the device 1000 may display at least one color or at least one size as the at least one value 1140 inputtable to the option selection field, together with outputting the audio signal indicating the induced inquiry corresponding to the option selection field.

Thus, in a situation where the user is capable of watching the screen of the device 1000, but is incapable of manipulating the device 1000 by hand, the device 1000 may display the at least one value 1140 inputtable to an input field on the screen, thereby allowing the user to easily and fast determine an input value of the input field.

In operation S1130, the device 1000 may display a text indicating a voice keyword corresponding to at least one value inputtable to the input field.

For example, referring to FIG. 11B, the device 1000 may display at least one value inputtable to the option selection field, "01_F1XKY00132_WHT", "02_F1XKX0102_BLK", "03_F1XKZ5311_BLK", and "04_F1_XKZ5312_GRY".

In this case, the device 1000 may display a text indicating voice keywords 1112 through 1118 corresponding to the at least one value. For example, the device 1000 may display a text 1112 indicating "01" as a voice keyword corresponding to "01_F1XKY00132_WHT" and a text 1114 indicating "02" as a voice keyword corresponding to "02_F1XKX0102_BLK".

Upon receipt of a voice input indicating one voice keyword among the at least one voice keywords 1112 through 1118, the device 1000 may determine a value corresponding to the received voice keyword as an input value of the input field.

For example, upon receipt of a voice input indicating a voice keyword 1114 "02", the device 1000 may determine a value corresponding to "02", "02_F1XKX0102_BLK", as an input value for the option selection field.

Upon receipt of a voice input indicating "02_Black", the device 1000 may detect a voice keyword 1114 "02" from the voice input, and determine "02_F1XKX0102_BLK" as the input value for the option selection field based on the detected voice keyword.

Thus, the user may easily and quickly set the input value for the input field by speaking a simple voice keyword, even without speaking all syllables of a value inputtable to the input field.

The device 1000 may also display voice keywords 1121 and 1123 for controlling an application. For example, the device 1000 may display voice keywords 1121 and 1123 "previous" and "next" as instructions for moving a page of an application, and display a previous page of the currently displayed page upon receipt of the voice keyword 1121 "previous".

The device 1000 may display a voice keyword differently from a text included in the page.

Figure 12A:
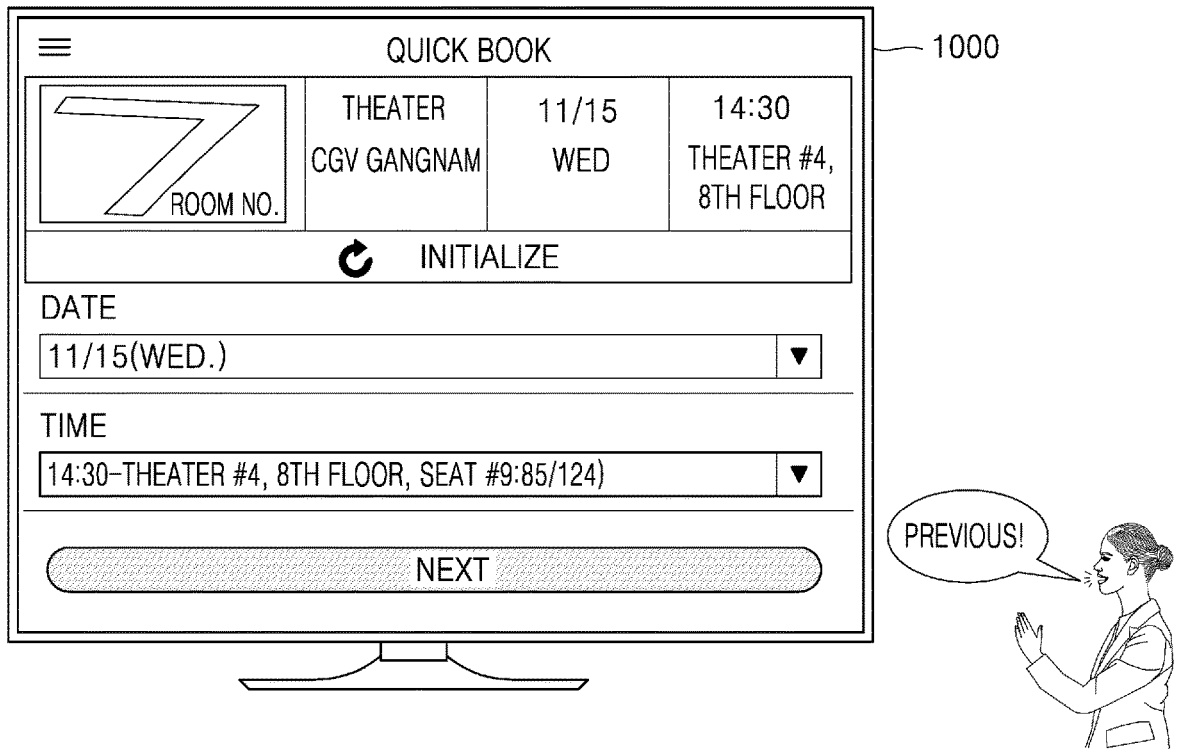
FIGS. 12A and 12B show a method, performed by a device, of outputting an induced inquiry as a page of an application moves, according to some embodiments.
Figure 12B:
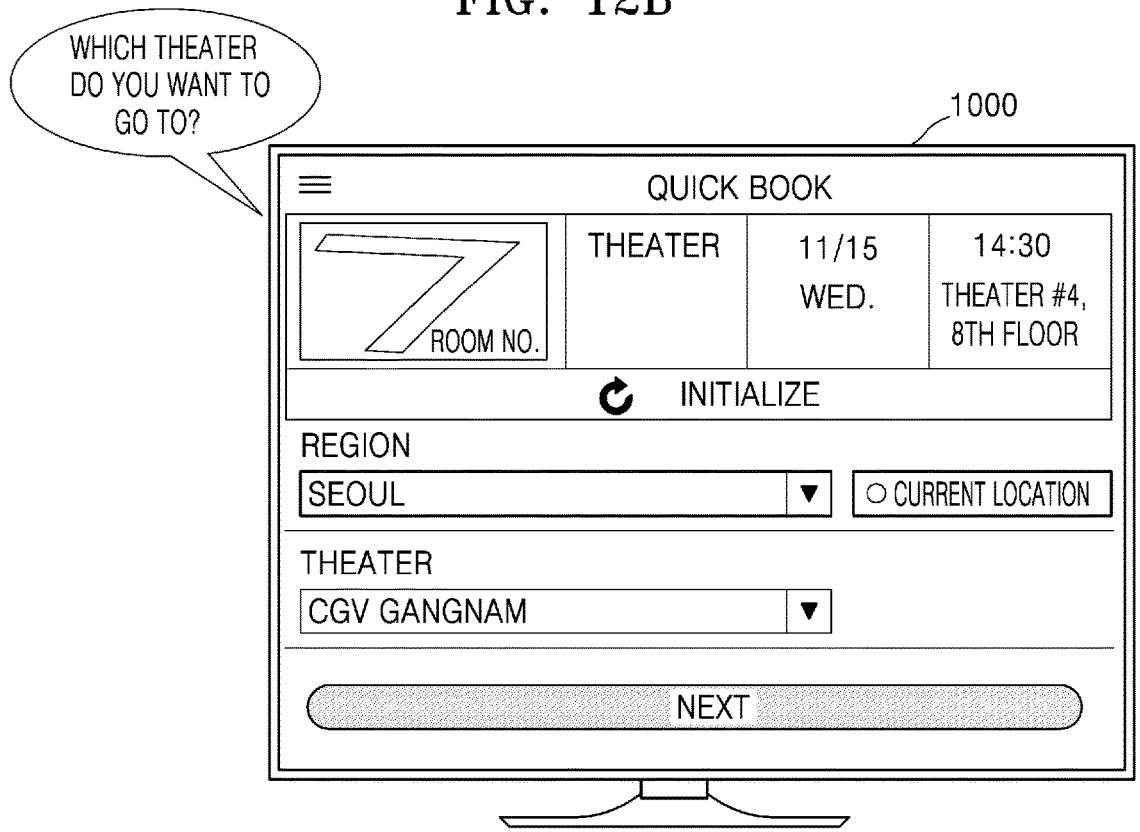

FIGS. 12A and 12B show a method, performed by the device 1000, of outputting an induced inquiry as a page of an application moves, according to some embodiments.

Referring to FIG. 12A, the device 1000 may receive a voice input for moving a page of an application. Upon receipt of the voice input "previous", the device 1000 may display a page previous to the currently displayed page.

Referring to FIG. 12B, the device 1000 may output an induced inquiry corresponding to an input field in the moved page, along with movement of the page. For example, upon movement to the page including the theater selection field, the device 1000 may output an audio signal indicating "Which theater do you want to go to?" stored corresponding to the theater selection field.

Figure 13A:
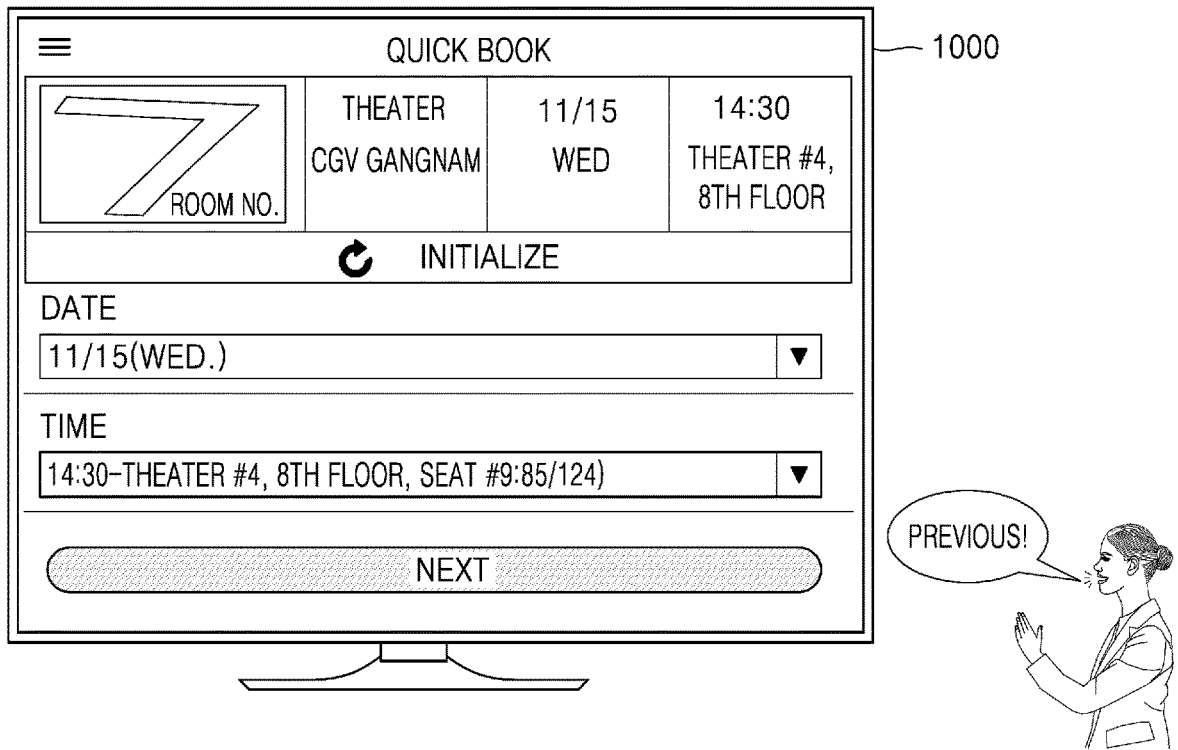
FIGS. 13A and 13B show a method, performed by a device, of outputting an induced inquiry upon receipt of a voice input to change an input value of an input field, according to some embodiments.
Figure 13B:
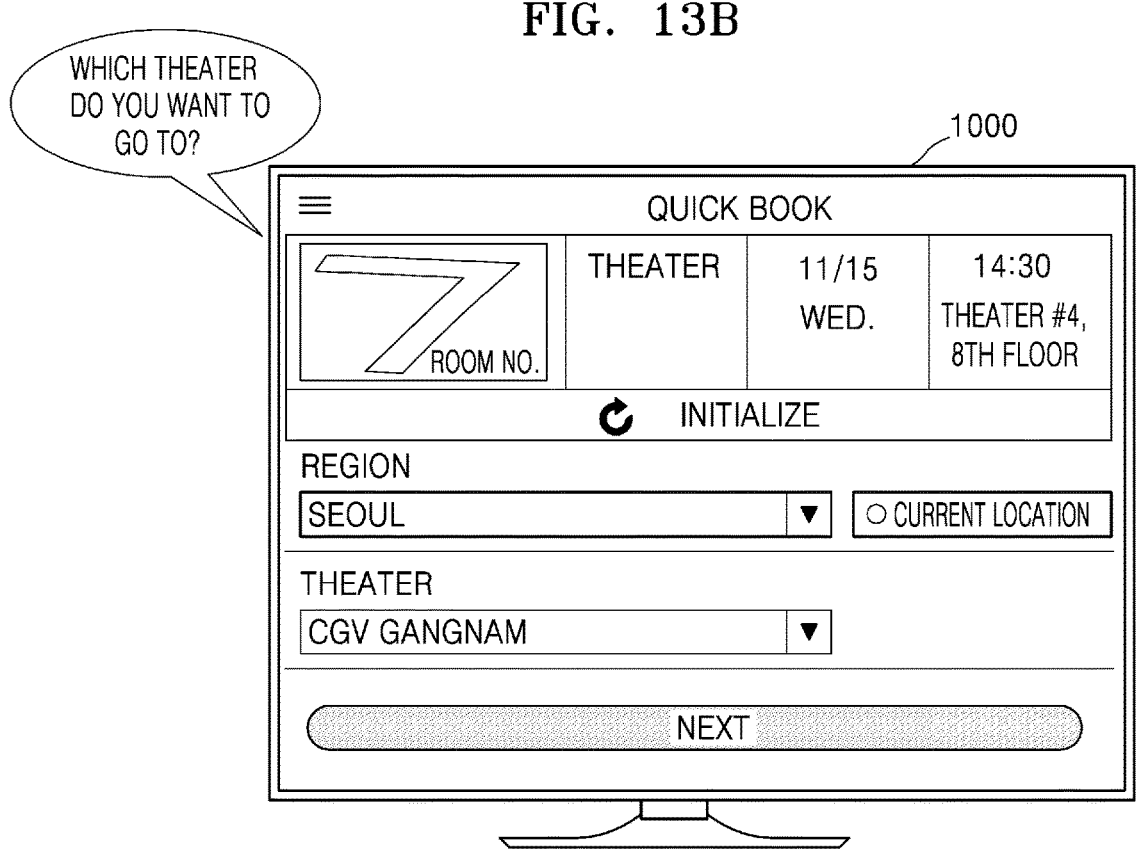

FIGS. 13A and 13B show a method, performed by the device 1000, of outputting an induced inquiry upon receipt of a voice input to change an input value of an input field, according to some embodiments.

Referring to FIG. 13A, the device 1000 may receive a voice input for changing an input value of an input field. For example, the device 1000 may receive a voice input for changing the input value of the theater selection field, "Change theater!" during execution of the movie booking application.

The device 1000 may determine that the received voice input is a voice input for changing the theater selection field, based on a keyword "theater" previously stored corresponding to the theater selection field and a keyword "change" stored corresponding to an operation of changing the input value of the input field.

Referring to FIG. 13B, the device 1000 may output an audio signal indicating an induced inquiry corresponding to an input field the user intends to change.

The device 1000 may display a page including the input field the user intends to change, together with outputting the audio signal.

FIGS. 14A, 14B, 15A, and 15B show an example to switch a method, performed by the device 1000, of receiving an input value with respect to an input field based on user's selection, according to some embodiments.

Figure 14A:
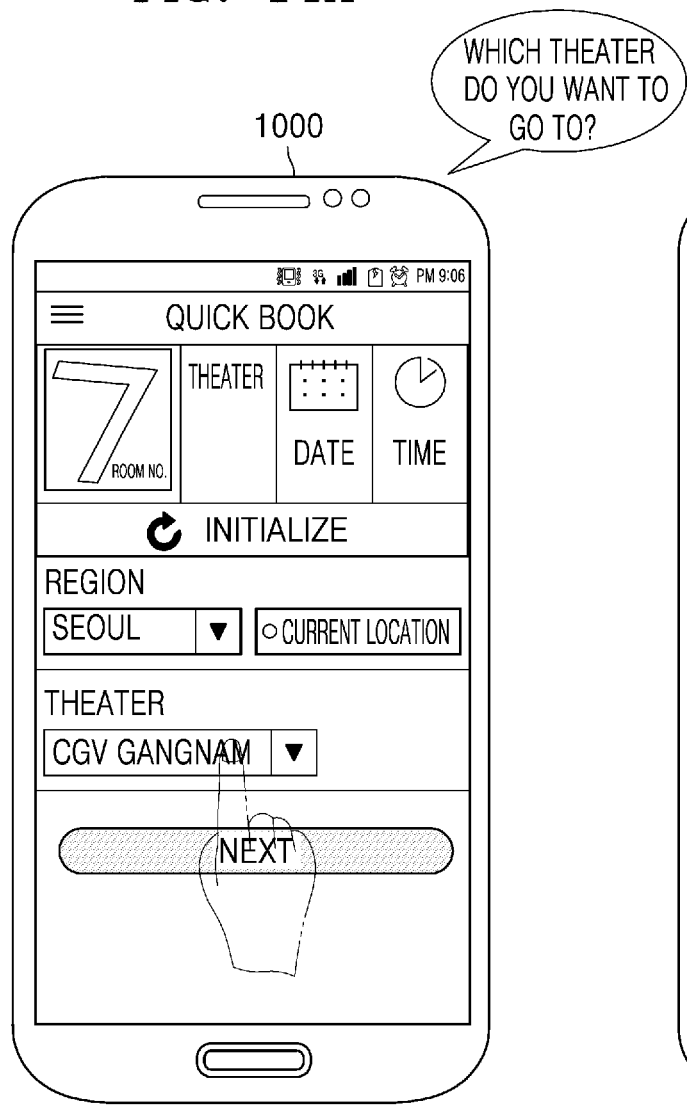

Referring to FIG. 14A, the device 1000 may execute a voice mode for controlling an application by outputting an audio signal indicating an induced inquiry and receiving a voice input from the user. The device 1000 may receive a user input to touch the screen during voice mode execution.

Figure 14B:
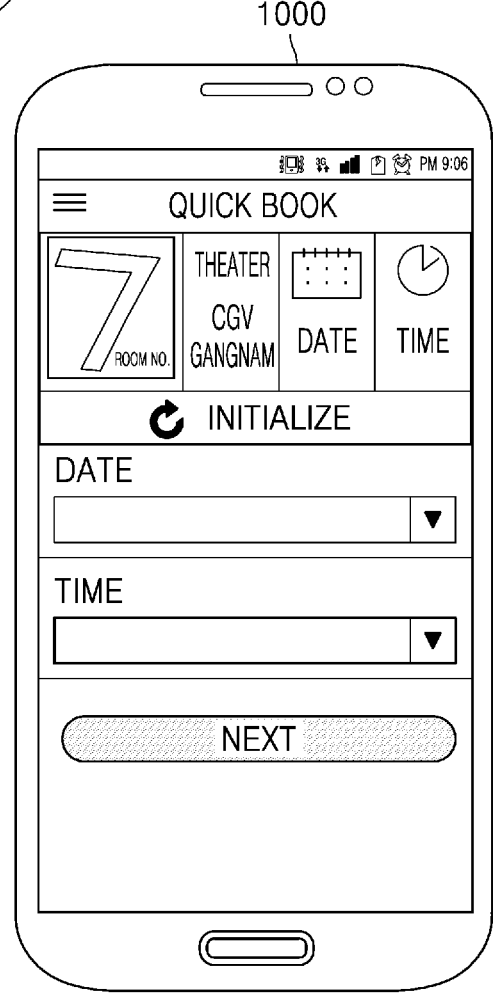

Referring to FIG. 14B, upon receipt of the user input to touch the screen during voice mode execution, the device 1000 may execute a GUI mode for controlling the application by receiving the user input through a GUI of the application. Thus, the device 1000 may not further output an audio signal indicating an induced inquiry corresponding to the input field.

Referring to FIG. 15A, the device 1000 may receive a user input to request voice mode execution during execution of a GUI mode.

For example, the device 1000 may receive a user input "Bixby! Execute voice mode!" to request voice mode execution. "Bixby!" may be a wakeup keyword for requesting the device 1000 to recognize a voice to be input next. As the device 1000 detects a keyword "voice mode execution" from the voice input, the device 1000 may change a GUI mode into the voice mode.

Referring to FIG. 15B, as the device 1000 changes the GUI mode into the voice mode, the device 1000 may detect at least one input field for which an input value is not set among the plurality of input fields, and output an audio signal indicating an induced inquiry corresponding to the detected at least one input field.

For example, when the input value for the time selection field is not set, the device 1000 may output an audio signal indicating an induced inquiry corresponding to the time selection field, "When do you want to watch the movie?".

Figure 16:
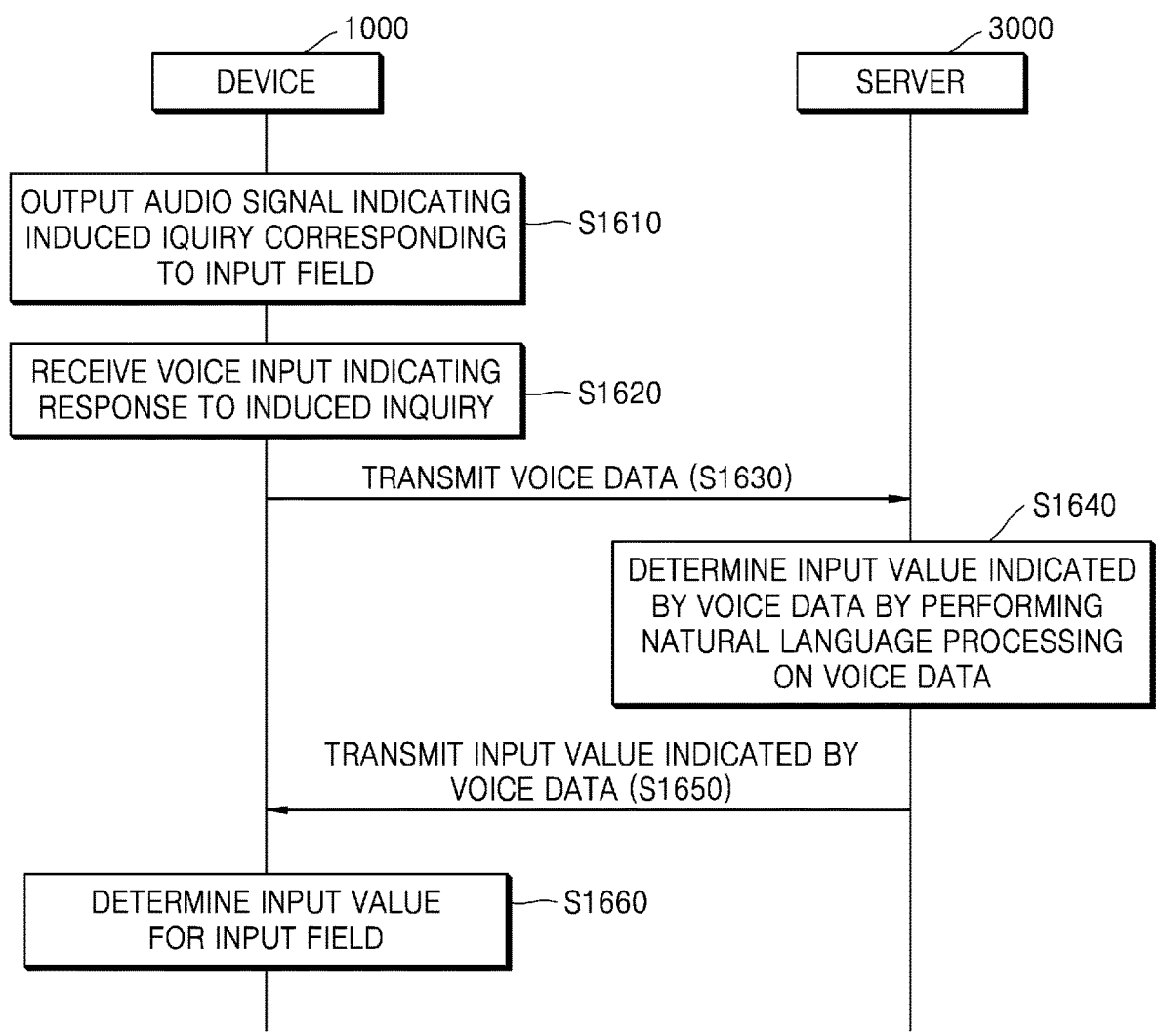
FIG. 16 is a flowchart of a method, performed by a device, of determining an input value with respect to an input field of an application by interworking with a server, according to some embodiments.

FIG. 16 is a flowchart of a method, performed by the device 1000, of determining an input value with respect to an input field of an application by interworking with a server, according to some embodiments.

In operation S1610, the device 1000 may output an audio signal indicating an induced inquiry corresponding to an input field. In operation S1620, the device 1000 may receive a voice input indicating a response to the induced inquiry.

In operation S1630, the device 1000 may transmit voice data to a server 3000.

The device 1000 may convert the received voice input into voice data and transmit the voice data to the server 3000, thus receiving an input value corresponding to an input field from the server 3000 without directly performing voice recognition.

The device 1000 may transmit identification information of an application and information about an input field of the application to the server. The information about the input field may include identification information of the input field, at least one value inputtable to the input field, and identification information of a page including the input field.

For example, when the application is the movie booking application, the identification information of the input field may be the "movie selection field", and the at least one value inputtable to the input field may be at least one movie title.

For example, when the application is the Internet shopping application, the identification information of the input field may be the "option selection field", and the at least one value inputtable to the input field may be an option value previously stored corresponding to the input field.

According to an embodiment, the server 3000 may acquire information about the input field of an application previously stored in the server 3000, based on the identification information of the application received from the device 1000.

The device 1000 may transmit identification information of the currently displayed page or identification information of an input field for which the current induced inquiry is output to the server 3000.

In operation S1640, the server 3000 may determine an input value indicated by voice data by performing natural language processing with respect to the voice data.

For example, upon receipt of voice data indicating "Book two seats for Room No.7 starting at 2:00 on Saturday!" from the device 1000, the server 3000 may detect words "Room No. 7", "Saturday", "2:00", "two seats", and "book" from the voice data.

The server 3000 may determine that the currently executed application is the movie booking application, based on the identification information of the application received from the device 1000. The server 3000 may store the movie selection field, the theater selection field, the time selection field, and the seat selection field as input fields of the movie booking application, store "Justice League", "Room No.7", "Happy Death Day", and "Thor: Ragnarok" as values inputtable to the movie selection field, store "CGV Gangnam", "CGV Dogok", and "CGV Guro" as values inputtable to the theater selection field, store show times in each theater as values inputtable to the time selection field, and store "one seat", "two seats", "three seats", etc., as values inputtable to the seat selection field.

The server 3000 may determine an input value of an input field by comparing the word detected from the voice data with values inputtable to the input field. For example, "The Outlaws" is one of values corresponding to the movie selection field, such that the device 1000 may determine "The Outlaws" as an input value of the movie selection field. In addition, "2:30" among values corresponding to the time selection field includes "2", such that the device 1000 may determine "2:30" as an input value of the time selection field. Moreover, "two seats" is one of values corresponding to the seat selection field, such that the device 1000 may determine "two seats" as an input value of the seat selection field.

In operation S1650, the device 3000 may transmit an input value indicated by voice data to the device 1000.

The server 3000 may transmit input values of at least one input field, together with determined identification information of the at least one input field, to the device 1000.

In operation S1660, the device 1000 may determine the input value for the input field.

The device 1000 may determine the input value for the input field, based on the identification information and input values of the at least one input field, received from the server 3000.

Figure 17:
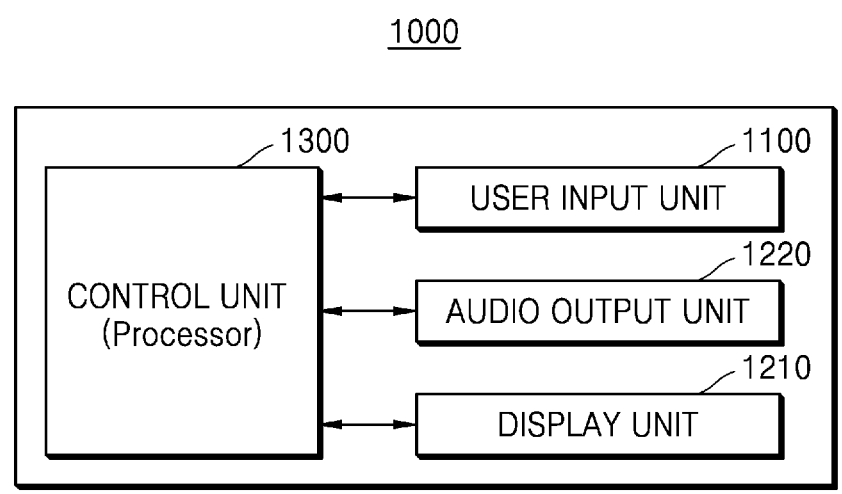
FIGS. 17 and 18 are block diagrams of a device according to some embodiments.
Figure 18:
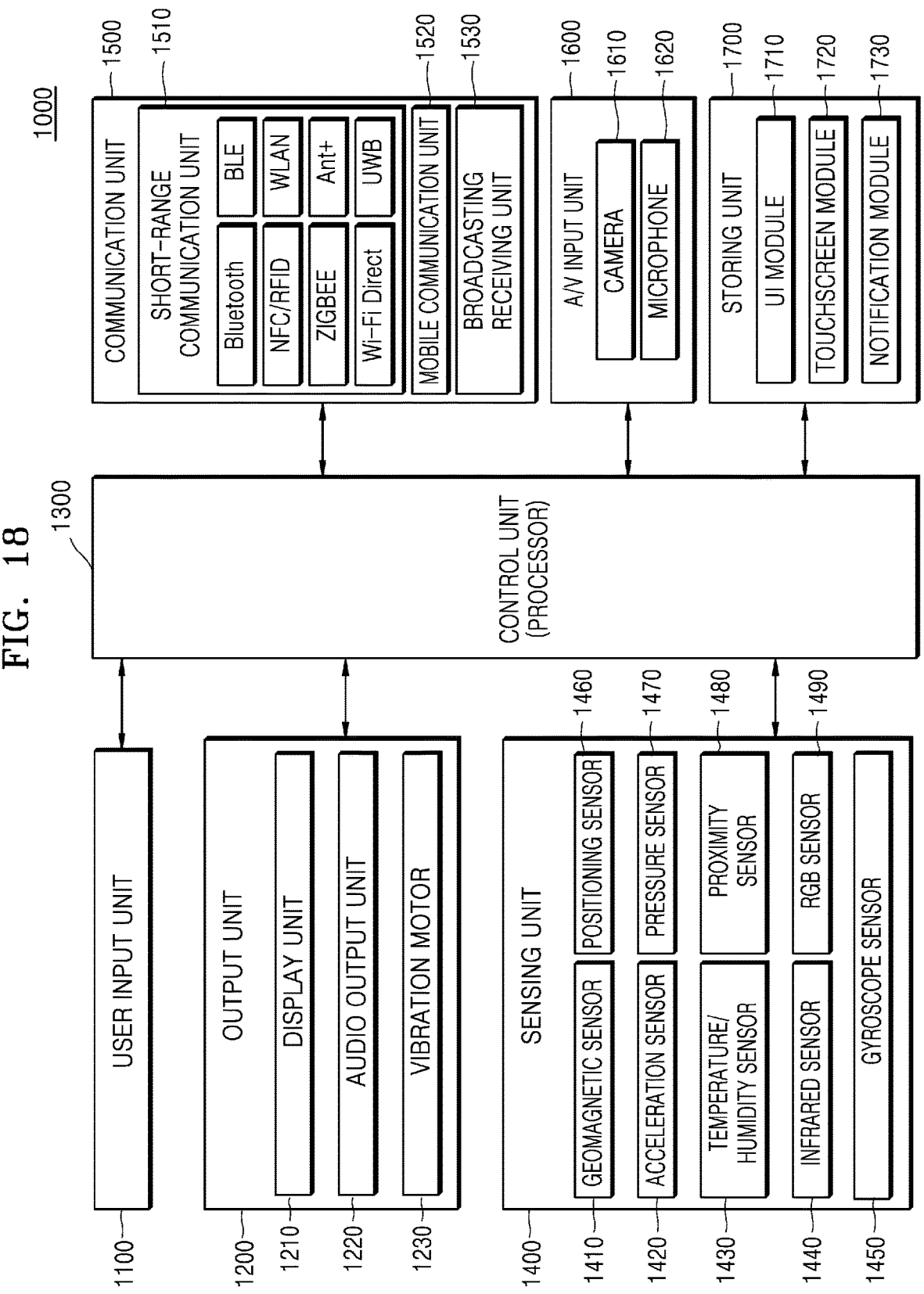

FIGS. 17 and 18 are block diagrams of the device 1000 according to some embodiments.

As shown in FIG. 17, the device 1000 according to some embodiments may include a user input unit 1100, a display unit 1210, an audio output unit 1220, and a control unit 1300. However, all of the elements shown in FIG. 17 are not essential elements of the device 1000. More elements or less elements than those shown in FIG. 17 may be used to implement the device 1000.

For example, the device 1000 according to some embodiments may be implemented merely with the control unit 1300 or with the user input unit 1100 and the control unit 1300.

For example, as shown in FIG. 18, the device 1000 according to some embodiments may further include an output unit 1200, a communication unit 1500, a sensing unit 1400, an audio/video (A/V) input unit 1600, and a memory 1700 in addition to the user input unit 1100, the display unit 1210, the audio output unit 1220, and the control unit 1300.

The user input unit 1100 may be a means through which a user inputs data for controlling the device 1000. For example, the user input unit 1100 may include, but not limited to, a keypad, a dome switch, a touch pad (a capacitive overlay type, a resistive overlay type, an infrared beam type, a surface acoustic wave type, an integral strain gauge type, a piezoelectric effect type, etc.), a jog wheel, a jog switch, etc.

For example, the user input unit 1100 may include a microphone 1620. While the microphone 1620 is shown as a part of the A/V input unit 1600, the microphone 1620 may function as the user input unit 1100 when the microphone 1620 receives a voice input for controlling the device 1000.

The user input unit 1100 may receive a user input to request execution of an application. For example, the touch pad may receive a user input to touch an icon of the application. For example, the microphone 1620 may receive a voice input to instruct execution of the application.

The microphone 1620 may receive a response of the user to an induced inquiry. The microphone 1620 may also receive a voice input of the user to control the device 1000.

The output unit 1200 outputs an audio signal, a video signal, or a vibration signal, and may include the display unit 1210, the audio output unit 1220, and a vibration motor 1230.

The audio output unit 1220 may output an audio signal indicating an induced inquiry corresponding to an input field. The audio output unit 1220 may output audio data received from the communication unit 1500 or stored in the memory 1700. The vibration motor 1230 outputs a vibration signal.

The display unit 1210 displays information processed by the device 1000. For example, the display unit 1210 may display a GUI of an application. The display unit 1210 may display an icon of the application. When the display unit 1210 and a touch pad are constructed as a touch screen in a layer structure, the display unit 1210 may be used as an input device as well as an output device. The display unit 1210 may include at least one of a liquid crystal display (LCD), a thin film transistor (TFT) LCD, an organic light-emitting diode (OLED), a flexible display, a three-dimensional (3D) display, and an electrophoretic display.

The control unit 1300 controls an overall operation of the device 1000. For example, the control unit 1300 may control in overall the user input unit 1100, the output unit 1200, the sensing unit 1400, the communication unit 1500, and the A/V input unit 1600 by executing programs stored in the memory 1700. The control unit 1300 may control operations of the device 1000 to perform a function of the device 1000 described with reference to FIGS. 1 through 16.

The sensing unit 1400 may include, but not limited to, at least one of a magnetic sensor 1410, an acceleration sensor 1420, a temperature/humidity sensor 1430, an infrared sensor 1440, a gyroscope sensor 1450, a positioning sensor (e.g., a global positioning system (GPS)) 1460, an illuminance sensor 1495, a proximity sensor 1480, and a red/green/blue (RGB) sensor (or an illuminance sensor) 1490. A function of each sensor may be intuitively construed from a name of each sensor by those of ordinary skill in the art, and thus will not be described in detail.

The communication unit 1500 may include one or more elements that enable the display device 1000 to communicate with an external device. For example, the communication unit 1500 may include a short-range wireless communication unit 1510, a mobile communication unit 1520, and a broadcasting receiving unit 1530.

The short-range wireless communication unit 1510 may include, but not limited to, a Bluetooth Low Energy (BLE) communication unit, a near field communication (NFC) unit, a wireless local area network (WLAN) (WiFi) communication unit, a ZigBee communication unit, an infrared Data Association (IrDA) communication unit, a WiFi Direct (WFD) communication unit, an ultra wideband (UWB) communication unit, and an Ant+ communication unit.

The mobile communication unit 1520 transmits and receives a radio signal to and from at least one of a base station, an external terminal, and a server over a mobile communication network. Herein, the radio signal may include various forms of data corresponding to transmission/reception of a voice call signal, a video communication call signal, or a text/multimedia message.

The broadcasting receiving unit 1530 receives a broadcast signal and/or broadcasting-related information from an external source through a broadcasting channel. The broadcasting channel may include a satellite channel and a terrestrial channel. According to implementation examples, the device 1000 may not include the broadcasting receiving unit 1530.

The A/V input unit 1600 may input an audio signal or a video signal, and may include a camera 1610, the microphone 1620, and so forth.

The memory 1700 stores programs for processing and control of the control unit 1300 and data input to or output from the device 1000.

The memory 1700 may include a storage medium of at least one type of a flash memory type, a hard disk type, a multimedia card micro type, a card type memory (e.g., a secure digital (SD) or extreme digital (XD) memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and so forth.

The programs stored in the memory 1700 may be classified into a plurality of modules depending on a function thereof, e.g., a user interface (UI) module 1710, a touch screen module 1720, a notification module 1730, an image filter module 1740, and so forth.

The memory 1700 may store information about an input field of an application. For example, the memory 1700 may store identification information of an input field of an application, page information including the input field, and information about a value inputtable to the input field.

The UI module 1710 provides a specialized UI or GUI interworking with the device 1000 for each application. The touch screen module 1720 may sense a touch gesture of a user on a touch screen and delivers information about the touch gesture to the control unit 1300. The touch screen module 1720 according to some embodiments may recognize and analyze a touch code. The touch screen module 1720 may be configured with separate hardware including a controller.

The control unit 1300 may execute an application including a GUI for receiving an input value of an input field.

Upon receipt of a user input to request execution of an application, the control unit 1300 may output an audio signal indicating an induced inquiry corresponding to the input field through the audio output unit 1220, based on whether the user input is a voice input.

The control unit 1300 may receive a voice input indicating a response to the induced inquiry through the microphone 1620.

The control unit 1300 may execute the application by setting the input value of the input field based on the voice input indicating the response to the induced inquiry.

For example, the control unit 1300 may output the audio signal indicating the induced inquiry corresponding to the input field, when the user input requesting execution of the application is the voice input.

In addition, when the user input to request execution of the application is an input made through the icon of the application, the control unit 1300 may display the GUI of the application without outputting the audio signal indicating the induced inquiry corresponding to the input field.

The control unit 1300 may also control the display unit 1210 to display a GUI including the input field in addition to outputting the audio signal indicating the induced inquiry corresponding to the input field.

Upon receipt of the voice input to request execution of the application, the control unit 1300 may control the display unit 1210 and the audio output unit 1220 to display a first page from among a plurality of pages, to output an audio signal indicating an induced inquiry corresponding to an input field included in the first page, to display a second page next to the first page upon determining an input value of the input field in the first page, and to output an audio signal indicating an induced inquiry corresponding to an input field included in the second page.

The control unit 1300 may set an input value for another input field based on the voice input, when the voice input indicating the response to the induced inquiry includes a response to the other input field in addition to the response to the input field among the plurality of input fields.

As the control unit 1300 sets the input value for the other input field, the control unit 1300 may control the audio output unit 1220 to output an audio signal indicating an induced inquiry corresponding to the remaining input field except for the other input field from among the plurality of input fields.

The communication unit 1500 may receive the at least one value selectable as the input value of the input field from an external server.

The control unit 1300 may determine the input value of the input field based on the received at least one value.

Upon receipt of the voice input to request execution of the application, the control unit 1300 may control the display unit 1210 and the audio output unit 1220 to output the audio signal indicating the induced inquiry corresponding to the input field without displaying the GUI including the input field.

The control unit 1300 may also set an input value of the remaining input field to a preset default value without generating an induced inquiry regarding the remaining input field except for at least one essential input field among the plurality of input fields.

The control unit 1300 may display at least one value inputtable to an input field and display a text indicating a voice keyword corresponding to the at least one value, while outputting an audio signal indicating an induced inquiry corresponding to the input field.

Some embodiments of the disclosure may be implemented with a recording medium including a computer-executable instruction such as a computer-executable programming module. A computer-readable recording medium may be an available medium that is accessible by a computer, and includes all of a volatile medium, a non-volatile medium, a separated medium, and a non-separated medium. The computer-readable recording medium may also include both a computer storage medium and a communication medium. The computer storage medium includes all of a volatile medium, a non-volatile medium, a separated medium, and a non-separated medium, which is implemented by a method or technique for storing information such as a computer-readable instruction, a data structure, a programming module, or other data. The communication medium includes a computer-readable instruction, a data structure, a programming module, or other data of a modulated data signal like carriers, or other transmission mechanisms, and includes an information delivery medium.

In the specification, the term "unit" may be a hardware component like a processor or a circuit, and/or a software component executed by a hardware component like a processor.

Those of ordinary skill in the art to which the present disclosure pertains will appreciate that the present disclosure may be implemented in different detailed ways without departing from the technical spirit or essential characteristics of the present disclosure. Accordingly, the aforementioned embodiments of the disclosure should be construed as being only illustrative, but should not be constructed as being restrictive from all aspects. For example, each element described as a single type may be implemented in a distributed manner, and likewise, elements described as being distributed may be implemented as a coupled type.

The scope of the present disclosure is defined by the following claims rather than the detailed description, and the meanings and scope of the claims and all changes or modified forms derived from their equivalents should be construed as falling within the scope of the present disclosure.

The invention claimed is:

1. A device for executing an application comprising a graphics user interface (GUI) for receiving an input value of an input field, the device comprising:
   a communication unit:
   an audio output unit;
   a user input unit receiving a user input to request execution of the application; and
   a control unit configured to:
      output through the audio output unit a first audio signal indicating a first induced inquiry corresponding to a first input field among a plurality of input fields when the user input is a voice input, wherein. the plurality of input fields include an essential input field and an additional input field, and the first induced inquiry is only generated for the essential input field;
      receive a first voice input indicating a response to the first induced inquiry,
      control the communication unit to transmit, to a server, identification information of an application, identification information of the plurality of input fields, at least one second value inputtable to the essential input field and identification information of a page including the plurality of input fields;
      control the communication unit to receive, from the server, at least one third value inputtable to the essential input field:
      detect a value for a second input field which is an essential field from the received first voice input;
      set a first input value for the second input field based on the detected value and the at least one third value;
      set a second input value for the additional input field to a preset default value, and execute the application by outputting a second audio signal indicating a second induced inquiry corresponding to a third essential input field for which a third input value is not set among the plurality of input fields.

2. The device of claim 1, wherein the control unit is further configured to output the first audio signal when the user input to request execution of the application is a voice input, and not to output the first audio signal when the user input is made through an icon of the application.

3. The device of claim 1, further comprising a display unit,
   wherein the control unit is further configured to control the display unit to display the GUI comprising the input field, in addition to outputting the first audio signal.

4. The device of claim 1, wherein the application comprises a plurality of pages to be displayed in an order, and the plurality of input fields comprises a first input field included in a first page and a second input field included in a second page, and
   wherein the control unit is further configured to:
      upon receipt of a second voice input to request execution of the application, display the first page from among the plurality of pages and output a third audio signal indicating a third induced inquiry corresponding to the first input field; and
      upon determining a fourth input value of the first input field, display the second page next to the first page and output a fourth audio signal indicating a fourth induced inquiry corresponding to the second input field.

5. The device of claim 1, wherein the control unit is further configured to, upon receipt of a second voice input to request execution of the application, output the first audio signal without displaying the GUI comprising the input field.

6. The device of claim 1, wherein the control unit is further configured to display at least one first value inputtable to the first input field and display a text indicating a voice keyword corresponding to the at least one first value, while outputting the first audio signal.

7. A method for executing an application comprising a graphics user interface (GUI) for receiving an input value of an input field, the method comprising:
   receiving a user input to request execution of the application;
   outputting a first audio signal indicating a first induced inquiry corresponding to a first input field among a plurality of input fields, when the user input is a voice input, wherein, the plurality of input fields include an essential input field and an additional input field, and the first induced inquiry is only generated for the essential input field;
   receiving a first voice input indicating a response to the first induced inquiry;
   transmitting identification information of an application, identification information of the plurality of input fields, at least one second value inputtable to the essential input field and identification information of a page including the plurality of input fields;
   receiving, from a server, at least one third value inputtable to the essential input field;
   detecting a value for a second input field which is essential field from the received first voice input:
   setting a first input value for the second input field based on the detected value and the at least one third value;
   setting a second input value for the additional input field to a preset default value; and
   executing the application by outputting a second audio signal indicating a second induced inquiry corresponding to a third essential input field for which a third input value is not set among the plurality of input fields.

8. The method of claim 7, wherein the first audio signal is output when the user input to request execution of the application is a voice input, and not output when the user input is made through an icon of the application.

9. The method of claim 7, wherein the outputting the first audio signal indicating the first induced inquiry corresponding to the first input field, comprises displaying the GUI comprising the first input field, in addition to outputting the first audio signal.

10. The method of claim 7, wherein the application comprises a plurality of pages to be displayed in an order, and the plurality of input fields comprises a first input field included in a first page and a second input field included in a second page, and
    wherein the outputting the first audio signal indicating the first induced inquiry corresponding to the first input field comprises:
       upon receipt of a second voice input to request execution of the application, displaying the first page from among the plurality of pages and outputting a third audio signal indicating a third induced inquiry corresponding to the first input field; and upon determining a fourth input value of the first input field, displaying the second page next to the first page and outputting a fourth audio signal indicating a fourth induced inquiry corresponding to the second input field.

11. The method of claim 7, wherein the outputting the first audio signal indicating the first induced inquiry corresponding to the first input field comprises, upon receipt of a second voice input to request execution of the application, outputting the first audio signal without displaying the GUI comprising the input field.

12. The method of claim 7, wherein the outputting the first audio signal indicating the first induced inquiry corresponding to the first input field comprises displaying at least one fourth value inputtable to the first input field and display a text indicating a voice keyword corresponding to the at least one fourth value while outputting the first audio signal.

\* \* \* \* \*